(12) United States Patent
Rodriguez et al.

(10) Patent No.: US 8,155,207 B2
(45) Date of Patent: Apr. 10, 2012

(54) PROCESSING AND MANAGING PICTURES AT THE CONCATENATION OF TWO VIDEO STREAMS

(75) Inventors: Arturo A. Rodriguez, Norcross, GA (US); James Au, Richmond (CA); Jan De Lameillieure, Kortrijk (BE); Samie Beheydt, Geluwe (BE)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 12/351,785

(22) Filed: Jan. 9, 2009

(65) Prior Publication Data

US 2009/0180547 A1    Jul. 16, 2009

Related U.S. Application Data

(60) Provisional application No. 61/019,964, filed on Jan. 9, 2008.

(51) Int. Cl.
*H04N 7/12* (2006.01)

(52) U.S. Cl. .................................................. 375/240.25

(58) Field of Classification Search ............ 375/240.01, 375/240.24, 240.25, 240.26, 240.28, 240.29
See application file for complete search history.

(56) References Cited

U.S. PATENT DOCUMENTS

| | | | |
|---|---|---|---|
| 5,440,345 A | 8/1995 | Shimoda | |
| 5,606,359 A | 2/1997 | Youden et al. | |
| 5,734,783 A | 3/1998 | Shimoda et al. | |
| 5,828,370 A | 10/1998 | Moeller et al. | |
| 5,917,830 A | 6/1999 | Chen et al. | |
| 5,917,988 A | 6/1999 | Eto | |
| 5,949,948 A | 9/1999 | Krause et al. | |
| 5,963,260 A | 10/1999 | Bakhmutsky | |
| 6,201,927 B1 | 3/2001 | Commer | |

(Continued)

FOREIGN PATENT DOCUMENTS

EP    0 812 112 A2    12/1997

(Continued)

OTHER PUBLICATIONS

Stuhlmuller, Klaus, et al., "Analysis of Video Transmission over Lossy Channels"; IEEE Journal on Selected Areas in Communication, vol. 18, No. 6, Jun. 2000, pp. 1012-1032.

(Continued)

*Primary Examiner* — Gilberto Barron, Jr.
*Assistant Examiner* — Malcolm Cribbs
(74) *Attorney, Agent, or Firm* — Merchant & Gould

(57) ABSTRACT

Systems and methods that receives a video stream in a transport stream, the first video stream comprising a plurality of compressed pictures, and that receives information in the video stream, wherein the information includes plural data fields, the received information comprising: a first data field corresponding to a location in the video stream of a potential splice point in the video stream, wherein the value of the first data field identifies a location in the video stream after the location of the received information in the video stream; a second data field corresponding to decompressed pictures yet to be output (DPYTBO) by a video decoder at the identified potential splice point (IPSP) when the video decoder decompresses the video stream, wherein the value of the second data field is a number corresponding to the DPYTBO by the video decoder at the IPSP; and a third data field corresponding to pictures with contiguous output times (WCOT), wherein the value of the third field corresponds to a set of pictures WCOT of the DPYTBO by the video decoder at the IPSP.

20 Claims, 10 Drawing Sheets

U.S. PATENT DOCUMENTS

| | | |
|---|---|---|
| 6,222,979 B1 | 4/2001 | Willis et al. |
| 6,304,714 B1 | 10/2001 | Krause et al. |
| 6,393,057 B1 | 5/2002 | Thoreau et al. |
| 6,512,552 B1 | 1/2003 | Subramanian |
| 6,658,199 B1 | 12/2003 | Hallberg |
| 6,806,909 B1 * | 10/2004 | Radha et al. ............... 348/384.1 |
| 6,909,743 B1 | 6/2005 | Ward et al. |
| 6,912,251 B1 | 6/2005 | Ward et al. |
| 7,027,713 B1 | 4/2006 | Hallberg |
| 7,050,603 B2 | 5/2006 | Rhoads et al. |
| 7,053,874 B2 | 5/2006 | Koyama |
| 7,185,018 B2 | 2/2007 | Archbold |
| 7,243,193 B2 | 7/2007 | Walmsley |
| 7,317,839 B2 | 1/2008 | Holcomb |
| 7,397,858 B2 | 7/2008 | Garrido et al. |
| 7,577,198 B2 | 8/2009 | Holcomb |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,656,410 B2 | 2/2010 | Chiu |
| 2002/0075402 A1 | 6/2002 | Robson et al. |
| 2002/0176025 A1 | 11/2002 | Kim |
| 2003/0043847 A1 | 3/2003 | Haddad |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2004/0078186 A1 | 4/2004 | Nair |
| 2004/0179619 A1 | 9/2004 | Tian et al. |
| 2004/0218816 A1 | 11/2004 | Hannuksela |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0229225 A1 | 10/2005 | Klausberger et al. |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0129914 A1 | 6/2006 | Ellis |
| 2006/0132822 A1 | 6/2006 | Walmsley |
| 2006/0147121 A1 | 7/2006 | Maeda et al. |
| 2006/0222319 A1 | 10/2006 | Russ |
| 2006/0294171 A1 | 12/2006 | Bossen |
| 2007/0019724 A1 | 1/2007 | Tourapis |
| 2007/0030186 A1 | 2/2007 | Archbold |
| 2007/0030356 A1 | 2/2007 | Yea |
| 2007/0030818 A1 | 2/2007 | Bahnck |
| 2007/0091997 A1 | 4/2007 | Fogg et al. |
| 2007/0109409 A1 | 5/2007 | Yea |
| 2007/0112721 A1 | 5/2007 | Archbold |
| 2007/0116426 A1 | 5/2007 | Toma et al. |
| 2007/0133674 A1 * | 6/2007 | Garnier et al. ............... 375/240 |
| 2007/0140358 A1 | 6/2007 | Schwartz et al. |
| 2007/0153679 A1 | 7/2007 | Jost et al. |
| 2007/0172133 A1 | 7/2007 | Kim |
| 2007/0223595 A1 | 9/2007 | Hannuksela et al. |
| 2007/0245382 A1 | 10/2007 | Doi et al. |
| 2008/0055463 A1 | 3/2008 | Lerner |
| 2008/0056383 A1 * | 3/2008 | Ueki et al. ............... 375/240.26 |
| 2008/0115175 A1 | 5/2008 | Rodriguez |
| 2008/0115176 A1 | 5/2008 | Rodriguez |
| 2008/0117985 A1 | 5/2008 | Chen |
| 2008/0131079 A1 | 6/2008 | Toma |
| 2008/0137742 A1 | 6/2008 | Chen |
| 2008/0163308 A1 | 7/2008 | Kim |
| 2008/0192817 A1 * | 8/2008 | Llach et al. ............... 375/240.01 |
| 2008/0225951 A1 | 9/2008 | Young |
| 2008/0247463 A1 | 10/2008 | Buttimer |
| 2008/0260045 A1 | 10/2008 | Rodriguez et al. |
| 2009/0002379 A1 | 1/2009 | Baeza |
| 2009/0003446 A1 | 1/2009 | Wu |
| 2009/0003447 A1 | 1/2009 | Christoffersen |
| 2009/0028247 A1 | 1/2009 | Suh |
| 2009/0034627 A1 | 2/2009 | Rodriguez et al. |
| 2009/0034633 A1 | 2/2009 | Rodriguez et al. |
| 2009/0073928 A1 | 3/2009 | Power |
| 2009/0100482 A1 | 4/2009 | Rodriguez et al. |
| 2009/0116558 A1 | 5/2009 | Chen |
| 2009/0141168 A1 | 6/2009 | Chen et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0190655 A1 | 7/2009 | Shimada |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez |
| 2009/0313662 A1 | 12/2009 | Rodriguez |
| 2009/0313668 A1 | 12/2009 | Shepherd |
| 2009/0323822 A1 | 12/2009 | Rodriguez |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027682 A1 | 2/2010 | Jeon |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0215338 A1 | 8/2010 | Rodriguez |
| 2010/0218232 A1 | 8/2010 | Rodriguez |
| 2010/0293571 A1 | 11/2010 | Rodriguez |
| 2010/0322302 A1 | 12/2010 | Rodriguez |

FOREIGN PATENT DOCUMENTS

| | | |
|---|---|---|
| EP | 1 292 138 A2 | 3/2003 |
| EP | 1 328 119 A1 | 7/2003 |
| JP | 05-236465 A | 9/1993 |
| KR | 10-2004-0054708 | 6/2004 |
| WO | WO 00/00981 A2 | 1/2000 |
| WO | WO 00/62552 A2 | 10/2000 |
| WO | 01/43440 | 6/2001 |
| WO | 01/63774 | 8/2001 |
| WO | WO 2004/102571 A1 | 11/2004 |
| WO | WO 2005/106875 A1 | 11/2005 |
| WO | WO 2006/083824 A2 | 8/2006 |
| WO | 2006/101979 | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

PCT Search Report cited in International Appln No. PCT/US2009/064180 mailed Jan. 8, 2010.

PCT Written Opinion cited in International Appln No. PCT/US2009/064180 mailed Jan. 8, 2010.

PCT Search Report cited in International Appln No. PCT/US2009/047521 mailed Dec. 22, 2009.

PCT Written Opinion cited in International Appln No. PCT/US2009/047521 mailed Dec. 22, 2009.
European Examination dated Sep. 16, 2010 in Application No. 08 796 875.6.
U.S. Non-Final Office Action in U.S. Appl. No. 11/627,452 dated Nov. 10, 2010.
U.S. Non-Final Office Action in U.S. Appl. No. 11/831,916 dated Aug. 4, 2010.
Canadian Office Action dated Dec. 11, 2009 in Application No. 2,533,169.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Appl. No. 12/709,851, filed Feb. 22, 2010 entitled "Signalling of Decodable Sub-Sequences", Inventor: Arturo A. Rodriguez.
U.S. Appl. No. 12/713,153, filed Feb. 25, 2010 entitled "Signalling of Auxiliary Information that Assists Processing of Video According to Various Formats", Inventors: Rodriguez et al.
U.S. Appl. No. 12/722,117, filed Mar. 11, 2010 entitled "Management of Picture Referencing in Video Streams for Plural Playback Modes", Inventors: Walton et al.
Hurst et al., "MPEG Splicing Tutorial and Proposed SMPTE Standard", Proceedings of the SMPTE Technical Conference, Nov. 1997, pp. 105-117.
International Preliminary Report on Patentability and Written Opinion dated Feb. 2, 2010 cited in International Application No. PCT/US2008/071111.
U.S. Non-Final Office Action dated Feb. 1, 2010 in U.S. Appl. No. 11/831,916.
International Search Report and Written Opinion dated Apr. 15, 2010 cited in International Application No. PCT/US2010/024927.
European Examination dated May 4, 2010 in Application No. 07 844 937.8.
U.S. Appl. No. 12/779,035, filed May 12, 2010 entitled "Signalling Buffer Characteristics for Splicing Operations of Video Streams", Inventors: Rodriguez et al.
U.S. Appl. No. 12/417,864, filed Apr. 3, 2009, entitled "System and Method for Authorization of Segment Boundary Notifications".
U.S. Appl. No. 12/492,117, filed Jun. 25, 2009, entitled "Support for Blocking Trick Mode Operations".
U.S. Appl. No. 12/483,925, filed Jun. 12, 2009, entitled "Picture Interdependencies Signals in Context of MMCO to Assist Stream Manipulation".
U.S. Appl. No. 12/417,868, filed Apr. 3, 2009, entitled "Segment Boundary Notification to a Digital Media Receiver".
U.S. Appl. No. 12/417,869, filed Apr. 3, 2009 entitled "System and Method for Processing Segment Boundary Notifications".
ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Tian et al., "Sub-Sequence Video Coding for Improved Temporal Scalability", 4 pages.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Amon et al., "File Format for Scalable Video Coding", IEEE Transactions on Circuits and Systems for Video Technology, vol. 17 No. 9, Sep. 2007, pp. 1174-1185.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I__PDF__E.pdf, XP007905991, pp. 1-76.
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.
"Splice Points for MPEG-2 Transport Streams", SMPTE Journal, SMPTE Inc., vol. 107 No. Oct. 1998, XP-000793004, pp. 916-925.
Rodriguez et al., "SEI message to convey suitable splice points in the bitstream", JVT Meeting, Document JVT-Z040, Filename JVT-Z040.doc, XP-30007329, Jan. 2008, pp. 1-8.
Luo et al., "On HRD conformance for splice bitstreams", JVT Meeting, Document JVT-V055r1, Filename JVT-V055r1.doc, XP-30006863, Jan. 2007, pp. 1-11.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 6, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.

* cited by examiner

_US 8,155,207 B2_

PROCESSING AND MANAGING PICTURES AT THE CONCATENATION OF TWO VIDEO STREAMS

CROSS-REFERENCE TO RELATED APPLICATIONS

This application claims priority to copending U.S. provisional application entitled, "SYSTEM AND METHODS FOR SPLICING AND CONCATENATING VIDEO BITSTREAMS," having Ser. No. 61/019,964 filed Jan. 9, 2008, which is entirely incorporated herein by reference.

This application is related to copending U.S. utility application entitled, "INDICATING PICTURE USEFULNESS FOR PLAYBACK OPTIMIZATION," having Ser. No. 11/831,916, filed Jul. 31, 2007, which claims priority to U.S. provisional application, "SYSTEM AND METHOD FOR SIGNALING CHARACTERISTICS OF PICTURES' INTERDEPENDENCIES," having Ser. No. 60/865,644, filed on Nov. 13, 2006, both of which are entirely incorporated herein by reference. Application Ser. No. 11/831,916 has also published on May 15, 2008 as U.S. Patent Publication No. 20080115176A1.

This application is related to copending U.S. utility application entitled, "CONVEYANCE OF CONCATENATION PROPERTIES AND PICTURE ORDERNESS IN A VIDEO STREAM," having Ser. No. 12/252,632, filed Oct. 16, 2008, which claims priority to U.S. provisional application entitled, "SPLICING AND PROCESSING VIDEO AND OTHER FEATURES FOR LOW DELAY," having Ser. No. 60/980,442, filed Oct. 16, 2007, both of which are entirely incorporated herein by reference.

TECHNICAL FIELD

Particular embodiments are generally related to processing of video streams.

BACKGROUND

Broadcast and On-Demand delivery of digital audiovisual content has become increasingly popular in cable and satellite television networks (generally, subscriber television networks). Various specifications and standards have been developed for communication of audiovisual content, including the MPEG-2 video coding standard and AVC video coding standard. One feature pertaining to the provision of programming in subscriber television systems requires the ability to concatenate video segments or video sequences, for example, as when inserting television commercials or advertisements. For instance, for local advertisements to be provided in national content, such as ABC news, etc., such programming may be received at a headend (e.g., via a satellite feed), with locations in the programming allocated for insertion at the headend (e.g., headend encoder) of local advertisements. Splicing technology that addresses the complexities of AVC coding standards is desired.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed embodiments. Moreover, in the drawings, like reference numerals designate corresponding parts throughout the several views.

DESCRIPTION OF EXAMPLE EMBODIMENTS

Overview

Figure 1:
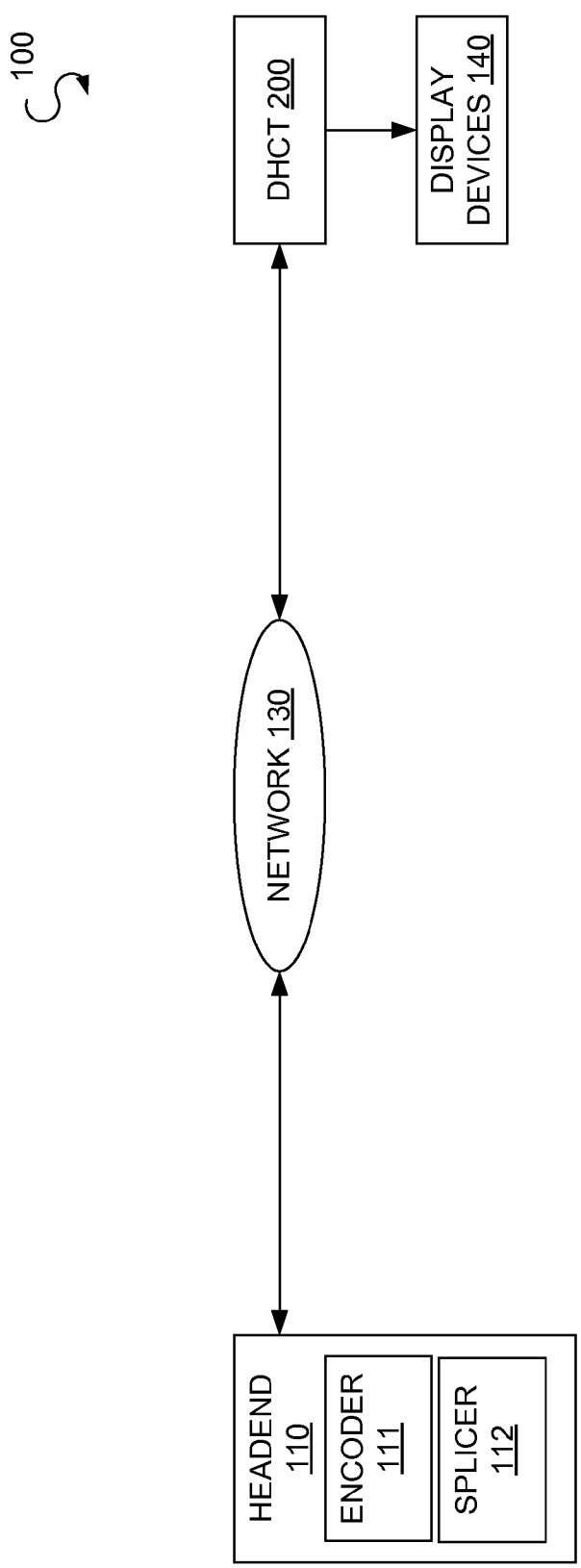
FIG. 1 is a block diagram that illustrates an example environment in which an embodiment of the disclosed apparatuses and methods may be employed.

In one embodiment, a method that receives a video stream in a transport stream, the first video stream comprising a plurality of compressed pictures, and that receives information in the video stream, wherein the information includes plural data fields, the received information comprising: a first data field corresponding to a location in the video stream of a potential splice point in the video stream, wherein the value of the first data field identifies a location in the video stream after the location of the received information in the video stream; a second data field corresponding to decompressed pictures yet to be output (DPYTBO) by a video decoder at the identified potential splice point (IPSP) when the video decoder decompresses the video stream, wherein the value of the second data field is a number corresponding to the DPYTBO by the video decoder at the IPSP; and a third data field corresponding to pictures with contiguous output times (WCOT), wherein the value of the third field corresponds to a set of pictures WCOT of the DPYTBO by the video decoder at the IPSP.

Example Embodiments

Certain system, apparatus, and method embodiments are disclosed that provide (and/or receive) information in a video stream to assist in the implementation of video processing operations at various devices throughout a subscriber television network. In one embodiment, information is conveyed by an encoding device (e.g., encoder) to a video processing device embodied as a splicer (or splicing device) to indicate where among subsequently transmitted compressed pictures one or more potential (e.g., suitable) splicing points occur.

The information may be conveyed in some embodiments as auxiliary information or as a message, such as an SEI (supplemental enhanced information) message, in the video stream (e.g., not at a transport layer). Alternatively, or in addition, such information may include an indication of the machine state of a decoded picture buffer (DPB) resident in a second video processing device (e.g., digital home communication terminal or DHCT), the machine state corresponding to the potential splicing point, which enables the splicer to concatenate, or in some embodiments, replace a video sequence provided by the encoding device with a second video sequence (e.g., commercial, such as provided by a local feed) during a transition period. The information may also include control information, which enables the DHCT to provide a seamless output from the DPB over a transition period, as well as (or alternatively) cues to various locations in the video stream. Additional description of these and other embodiments are disclosed below.

A description of the MPEG-2 Video Coding standard can be found in the following publication, which is hereby incorporated by reference: (1) ISO/IEC 13818-2, (2000), "Information Technology—Generic coding of moving pictures and associated audio—Video." A description of the AVC video coding standard can be found in the following publication, which is hereby entirely incorporated by reference: (2) ITU-T Rec. H.264 (2005), "Advanced video coding for generic audiovisual services." A description of MPEG-2 Systems for transporting AVC video streams in MPEG-2 Transport packets can be found in the following publications, which are hereby entirely incorporated by reference: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams." Additionally, also published is ITU Rec H.264/ISO/IEC 14496 Part 10, which is incorporated herein by reference.

FIG. 1 is a high-level block diagram depicting an example environment in which an embodiment of apparatuses, systems, and/or methods that convey and use information corresponding to potential splice points and decoded picture buffer state information (e.g., machine state, such as consecutive picture order, etc.) are implemented. In particular, FIG. 1 is a block diagram that depicts an example subscriber television system (STS) 100. In this example, the STS 100 includes a headend 110 and one or more video processing devices, the latter embodied in this example as a DHCT 200. The DHCT 200 and the headend 110 are coupled via a network 130. The headend 110 and the DHCT 200 cooperate to provide a user with television services including, for example, broadcast video programs, an interactive program guide (IPG), and/or video-on-demand (VOD) presentations, among others. The television services are presented via the display device 140, which is typically a television set that, according to its type, is driven with an interlaced scan video signal or a progressive scan video signal. However, the display device 140 may also be any other device capable of displaying video images including, for example, a computer monitor, a mobile phone, game device, etc. Although shown communicating with a display device 140, the DHCT 200 may communicate with other devices that receive, store, and/or process video streams from the DHCT 200, or that provide or transmit video streams or uncompressed video signals to the DHCT 200.

The DHCT 200 is typically situated at a user's residence or place of business and may be a stand-alone unit or integrated into another device such as, for example, the display device 140, a personal computer, personal digital assistant (PDA), mobile phone, among other devices. The DHCT 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130. The DHCT 200 comprises, among other components, a decoded picture buffer (DPB), as explained further below.

The network 130 may include any suitable medium for communicating video and television service data including, for example, a cable television network or a satellite television network, among others. The headend 110 may include one or more server devices (not shown) for providing video, audio, and other types of media or data to client devices such as, for example, the DHCT 200.

The headend 110 also includes one or more encoders (encoding devices, compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed at different locations within the STS 100. The systems and methods disclosed herein are applicable to any video compression method performed according to a video compression specification allowing for at least one type of compressed picture that can depend on the corresponding decompressed version of each of more than one reference picture for its decompression and reconstruction. For example, the encoder 111 may compress the inputted video signal (e.g., from a provider or from a headend server) according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture. The compressed video (and audio) streams are produced in accordance with the syntax and semantics of a designated video (and audio) coding method, such as, for example, MPEG-2 or AVC, so that the compressed video (and audio) streams can be interpreted by a decompression engine 222 (FIG. 2) for decompression and reconstruction at a future time. Each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream.

In one embodiment, the encoder 111 provides a compressed video stream in a transport stream with information that conveys to the splicer 112 one or more suitable splice points as described further below. The splicer 112 splices one or more video sequences of a second video stream (e.g., provided by a video source separate than the video source that provides the first video stream) to the video stream provided by the encoder 111, and/or in some embodiments, replaces one or more of the video sequences provided by the encoder 111 with other video sequences. Further, the splicer 112 may pass the information provided by the encoder 111, with or without modification, to the DHCT 200, and/or generate additional control information based on the received information, the control information received at and used by the DHCT 200 to enable a seamless output of the pictures (decoded pictures) from the DPB of the DHCT 200 across a concatenation.

Any of the below described subsystems or methods of DHCT 200, encoder 111, and/or splicer 112 can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 2:
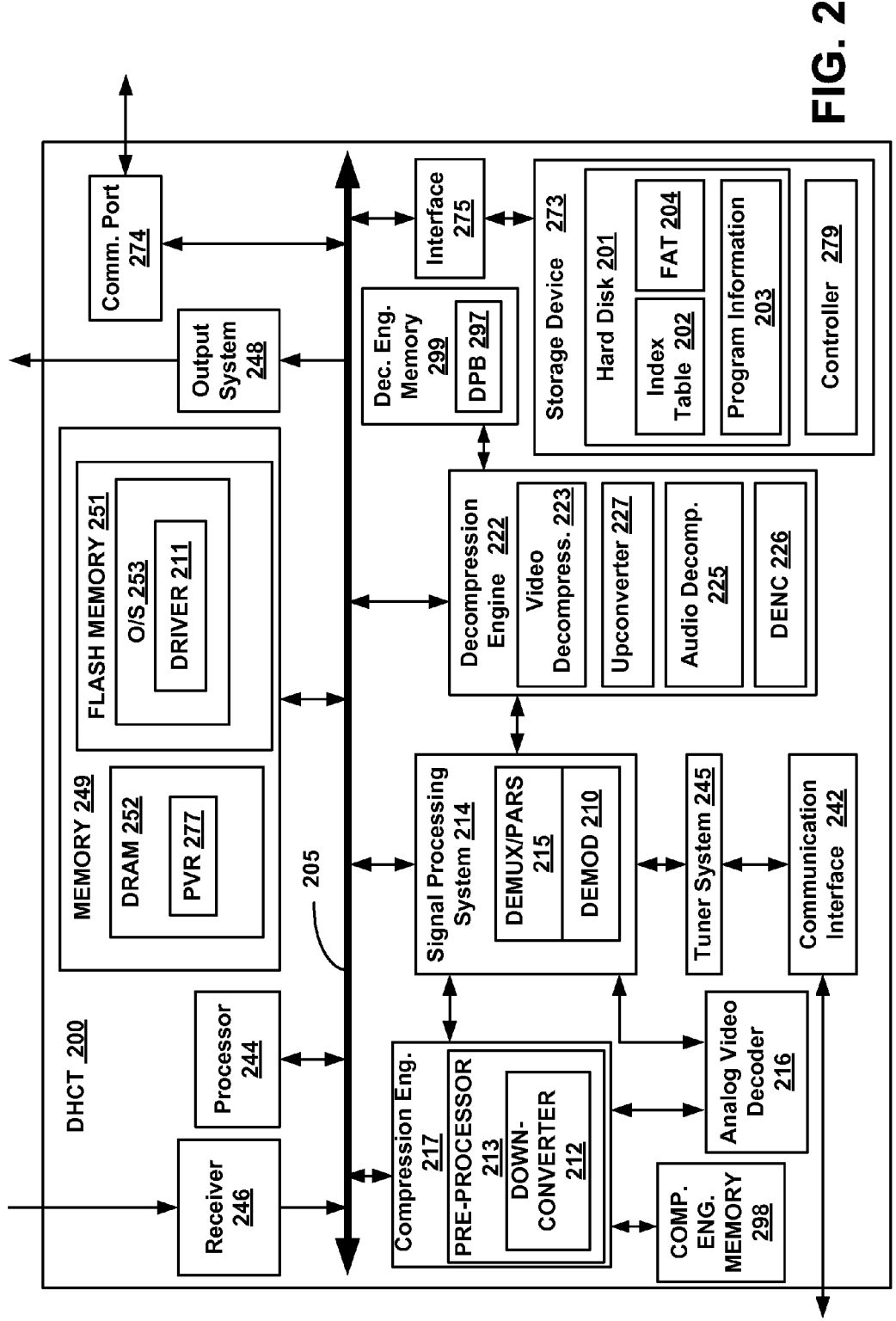
FIG. 2 is a block diagram of an example video processing device, embodied as a digital home communication terminal (DHCT), which includes functionality to receive, decode, and output a compressed video stream comprising concatenated video sequences according to information included in the video stream.

FIG. 2 is a block diagram of an embodiment of a DHCT 200 as depicted in FIG. 1, in which an embodiment of systems and methods that implement, at least in part, processing of compressed video and information used in enabling the output of pictures from the DPB. It will be understood that the DHCT 200 shown in FIG. 2 is merely illustrative and should not be construed as implying any limitations upon the scope of the disclosure. For example, in some embodiments, the DHCT 200 may have fewer, additional, and/or different components than the components illustrated in FIG. 2.

The DHCT 200 preferably includes a communications interface 242 for receiving signals (video, audio and/or other data) from the headend 110 (FIG. 1) through the network 130 (FIG. 1), and provides reverse information to the headend 110.

The DHCT 200 may further include one or more processors (one processor 244 is shown) for controlling operations of the DHCT 200, an output system 248 for driving the television display 140 (FIG. 1), and a tuner system 245 for tuning to a particular television channel and/or frequency and for sending and receiving various types of data to/from the headend 110 (FIG. 1). The DHCT 200 may include, in some embodiments, multiple tuners for receiving downloaded (or transmitted) data. The tuner system 245 can select from a plurality of transmission signals provided by the subscriber television system 100 (FIG. 1). The tuner system 245 enables the DHCT 200 to tune to downstream media and data transmissions, thereby allowing a user to receive digital media content via the subscriber television system 100. In one embodiment, analog TV signals can be received via tuner system 245. The tuner system 245 includes, in one implementation, an out-of-band tuner for bi-directional data communication and one or more tuners (in-band) for receiving television signals. Additionally, a receiver 246 receives externally-generated user inputs or commands from an input device such as, for example, a remote control device (not shown).

The DHCT 200 may include one or more wireless or wired interfaces, also called communication ports or interfaces 274, for receiving and/or transmitting data or video streams to other devices. For instance, the DHCT 200 may feature USB (Universal Serial Bus), Ethernet, IEEE-1394, serial, and/or parallel ports, etc. The DHCT 200 may be connected to a home network or local network via communication interface 274. The DHCT 200 may also include an analog video input port for receiving analog video signals. User input may be provided via an input device such as, for example, a hand-held remote control device or a keyboard.

The DHCT 200 includes at least one storage device 273 for storing video streams received by the DHCT 200. A PVR application 277, in cooperation with operating system 253 and device driver 211, effects among other functions, read and/or write operations to/from the storage device 273. The processor 244 may provide and/or assist in control and program execution for operating system 253, device driver 211, applications (e.g., PVR 277), and data input and output. The processor 244 may further provide and/or assist in receiving and processing information corresponding to splice points and/or machine state in the received video stream, and decoding and outputting a video stream according to the received information. Herein, references to write and/or read operations to the storage device 273 can be understood to include operations to the medium or media of the storage device 273. The device driver 211 is generally a software module interfaced with and/or residing in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 may be located internal to the DHCT 200 and coupled to a common bus 205 through a communication interface 275. The communication interface 275 may include an integrated drive electronics (IDE), small computer system interface (SCSI), IEEE-1394 or universal serial bus (USB), among others. Alternatively or additionally, the storage device 273 may be externally connected to the DHCT 200 via a communication port 274. The communication port 274 may be according to the specification, for example, of IEEE-1394, USB, SCSI, or IDE. In one implementation, video streams are received in the DHCT 200 via communications interface 242 and stored in a temporary memory cache (not shown). The temporary memory cache may be a designated section of DRAM 252 or an independent memory attached directly, or as part of a component in the DHCT 200. The temporary cache is implemented and managed to enable media content transfers to the storage device 273. In some implementations, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

The DHCT 200 includes a signal processing system 214, which comprises a demodulating system 210 and a transport demultiplexing and parsing system 215 (herein demultiplexing system) for processing broadcast and/or on-demand media content and/or data. One or more of the components of the signal processing system 214 can be implemented with software, a combination of software and hardware, or in hardware. The demodulating system 210 comprises functionality for demodulating analog or digital transmission signals.

An encoder or compression engine, as explained above, may reside at the headend 110 (e.g., embodied as encoder 111), in the DHCT 200 (e.g., embodied as compression engine 217), or elsewhere. The compression engine 217 can receive a digitized uncompressed video signal, such as, for example, one provided by analog video decoder 216, or a decompressed video signal produced by a decompression engine (e.g., decompression engine 222) as a result of decompressing a compressed video signal.

In one embodiment, digitized pictures and respective audio output by the analog video decoder 216 are presented at the input of the compression engine 217, which compresses the uncompressed sequence of digitized pictures according to the syntax and semantics of a video compression specification. Thus, the compression engine 217 implements a video compression method or algorithm that corresponds to a respective video compression specification, such as the AVC standard, to provide a video stream.

In some embodiments, a compression engine with similar compression capabilities, such as one that can produce AVC streams, is connected to the DHCT 200 via communication port 274, for example, as part of a home network. In another embodiment, a compression engine with similar compression capabilities, such as one that can produce AVC streams, may be located at the headend 110 or elsewhere in the network 130, as explained above. In some embodiments, the compression engine 217 in may include capabilities to provide splicing information (e.g., including control information) for a produced video stream, such as when locally stored video sequences (e.g., commercials stored in the storage device 273) are intended for local concatenation (e.g., locally spliced) and subsequent decoding and output.

The demultiplexing system 215 can include MPEG-2 transport demultiplexing capabilities. When tuned to carrier frequencies carrying a digital transmission signal, the demultiplexing system 215 enables the separation of packets of data, corresponding to the desired AVC stream, for further processing. Concurrently, the demultiplexing system 215 precludes further processing of packets in the multiplexed transport stream that are irrelevant or not desired, such as packets of data corresponding to other video streams. Parsing capabilities of the demultiplexing system 215 allow for the ingesting by the DHCT 200 of program associated information carried in the transport packets.

The components of the signal processing system 214 are generally capable of QAM demodulation, forward error correction, demultiplexing of MPEG-2 transport streams, and parsing of packets and streams. Stream parsing may include parsing of packetized elementary streams or elementary streams. In yet another embodiment, processor 244 performs parsing, processing, and interpretation of information. The signal processing system 214 further communicates with the processor 244 via interrupt and messaging capabilities of the DHCT 200. The processor 244 annotates the location of pictures within the video stream or transport stream as well as other pertinent information corresponding to the video stream.

The packetized compressed streams can also be outputted by the signal processing system 214 and presented as input to the decompression engine 222 for audio and/or video decompression. The signal processing system 214 may include other components (not shown), including memory, decryptors, samplers, digitizers (e.g., analog-to-digital converters), and multiplexers, among others.

Upon effecting the demultiplexing and parsing of the transport stream, the processor 244 interprets the data output by the signal processing system 214 and generates ancillary data in the form of a table or data structure (index table 202) comprising the relative or absolute location of the beginning of certain pictures in the compressed video stream.

The demultiplexing system 215 can parse the received transport stream (or the stream generated by the compression engine 217, which in some embodiments may be a program stream) without disturbing its video stream content and deposit the parsed transport stream (or generated program stream) into the DRAM 252. The processor 244 causes the transport stream in DRAM 252 to be transferred to a storage device 273. Additional relevant security, authorization and/or encryption information may be stored.

A decompression engine 222 comprises one or more software and/or hardware components (collectively logic) including video decompression logic 223, upconverter logic 227, audio decompression logic 225, and a DENC 226. Note that in some embodiments, one or more of the above-described logic may be distributed among several components, or omitted in some embodiments. The decompression engine 222 provides decoding functionality responsive in some embodiments to information received in the stream, the information identifying splice points or indicators of splice points or potential splice points, and/or output behavior of one or more pictures of the decoded picture buffer (DPB) 297 residing in one embodiment in decompression engine memory 299. Note that at least in one embodiment, reference herein to a decoding system comprises decoding functionality and cooperating elements, such as found in the collective functionality of the decompression engine 222, processor 244, signal processing system 214, and memory. In some embodiments, the decoding system can comprise fewer, greater, or different elements. Further, certain system and method embodiments include components from the headend (e.g., the encoder 111, etc.) and/or components from the DHCT 200, although a fewer or greater amount of components may be found in some embodiments.

Figure 3:
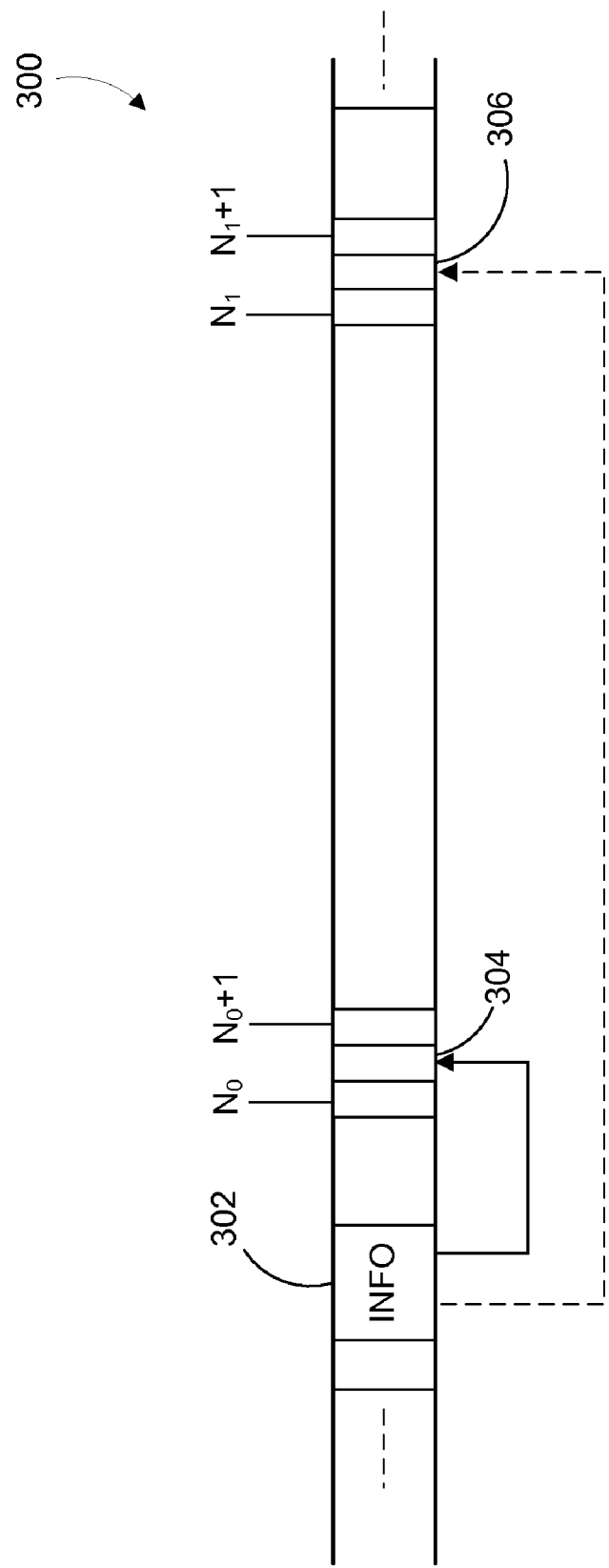
FIG. 3 is a block diagram that illustrates an example video stream comprising information that assists splice operations and/or picture output behavior.
Figure 4:
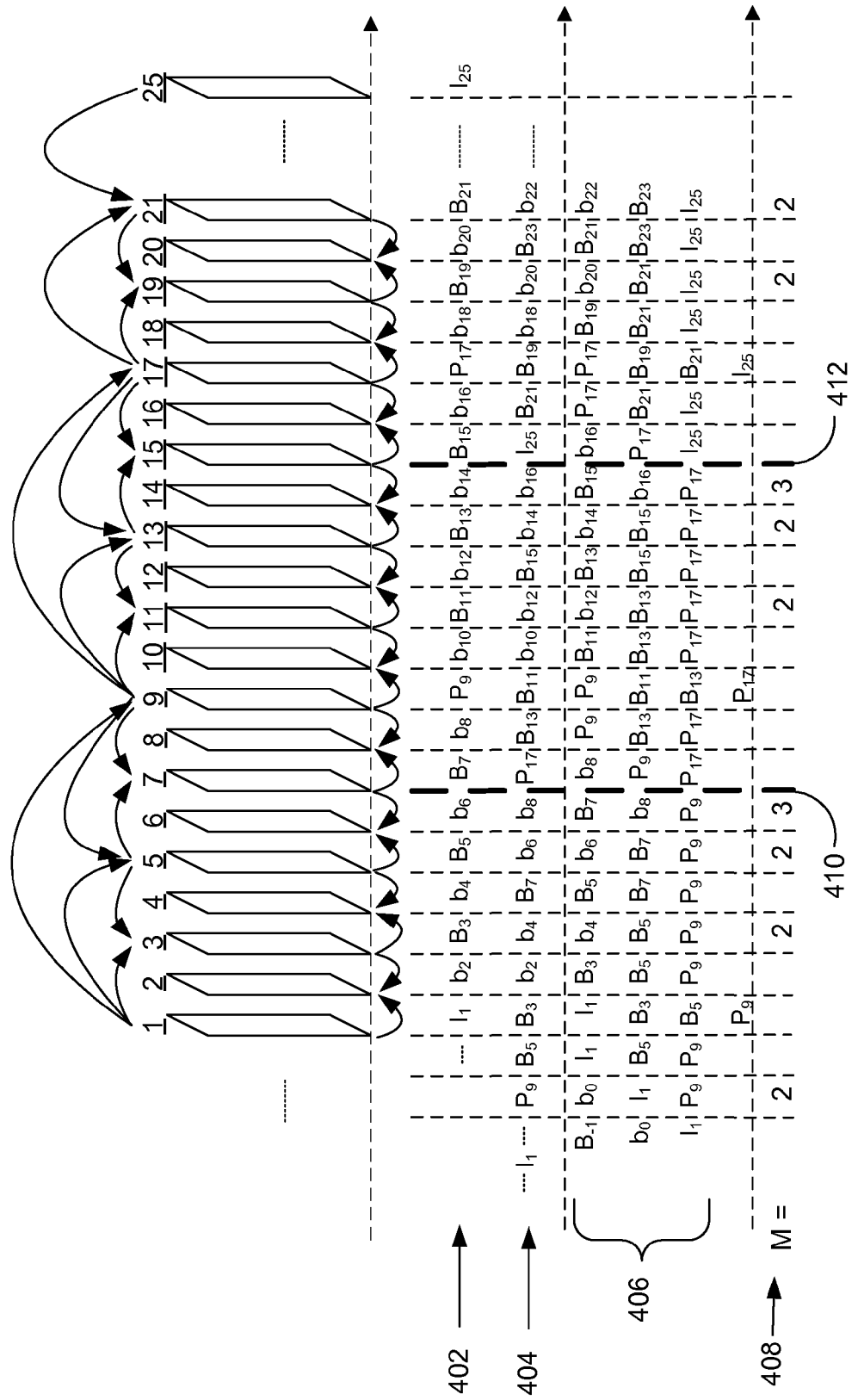
FIG. 4 is a block diagram that illustrates a concept of consecutive picture output order in a decoded picture buffer as related to the information conveyed in a video stream.

Having provided example environments in which certain embodiments of the disclosed systems and methods may be employed, attention is directed to FIGS. 3 and 4 in conjunction with the following description. It is noted that some of the below description pertaining to the conveyance of information (e.g., conveyance of N and M, as described below) may also be found, at least in part, in one or more of the commonly assigned and co-pending applications cited in the cross-reference section above. With regard to FIG. 3, shown in an example video stream 300, for instance as provided by the encoder 111. In some embodiments, the video stream 300 may be provided in a transport stream. A message 302 provided in the video stream 300 includes information that conveys the relative location from a current picture (picture, frame, or access unit) or the location of the message 302 in the bitstream 300 to, for example, immediately after a second access unit (the second access unit designated for illustrative purposes as No, and the location immediately after the second access unit in the bitstream 300 is designated as 304) to identify a location or a property. The number of pictures or access units, N, identifies the location in the bitstream 300 (i.e., the video stream), and N may be expressed in the message 302 in one of different forms that connotes the number of consecutive frames, access units, pictures, slices, fields, or time ticks, or in the bitstream to identify a location (e.g., 304) from the location of the provided message 302. Different embodiments express N differently, as shown below. One method does not convey N in the message 302.

Thus, N expresses the number of consecutive pictures or access units between the two locations (e.g., 302 and 304) in the bit stream 300. A data field is a data element that conveys the value for N. The data element may be pre-assigned to a particular "non-zero" value that is sufficient to identify the $N^{th}$ picture in the bit stream 300 (or herein AVC stream) as the picture or point in the bitstream 300 identifying particular property or location. Note that in some embodiments, the message 302 may provide a cue to additional potential splice points, such as potential splice point 306 immediately following the $N_1^{th}$ picture and immediately preceding the $N_1+1^{th}$ picture in the video stream 300.

Information conveying a stream property provides: (1) a location in the AVC stream where the stream property becomes effective, and (2) information related to, and identifying, a particular stream property. The conveyed information enables a video processing device to perform a corresponding stream manipulation operation that is suitable to be performed at the location in the AVC stream where the identified particular stream property is effective. For instance, a first stream property may be a "suitable splice point," which is a location in the AVC stream suitable for transitioning from the AVC stream into another AVC stream, such as an advert or commercial. A suitable splice point may be also called a potential splice point or an identified or determined splice point.

In one embodiment, the message 302 includes a form of providing a value for N consecutive pictures in a first AVC stream (e.g., 300) corresponding to the location for a "suitable splice point" (e.g., 304) that allows a stream splicing operation to performed by a splicing device from the first bitstream 300 to a second bitstream (not shown). A first data element provides a value, N, corresponding to the number of consecutive pictures, including the first picture, to identify the location 304 after the $N^{th}$ picture and prior to the $(N+1)^{th}$ picture as the location in the first AVC stream 300 where the "suitable splice point" becomes effective. A second data element provides a value, M, that conveys the number of decompressed pictures in the decoded picture buffer (DPB) (e.g., DPB 297, FIG. 2) that have successive picture-output times, with the first of the successive output times being at the picture-output time immediately after the decompression time of the $N^{th}$ picture. The DPB 297 is in accordance with the AVC (also ITU H.264) standard and resides in decompression memory (e.g., decompression engine memory 299) of a decoder (e.g., decompression engine 222). The location 304 in the AVC stream 300 where the "suitable splice point" becomes effective equals the decompression time of the $N^{th}$ picture (i.e., under the assumption of a hypothetical instantaneous decoder). The earliest output time of the M decompressed pictures of the first AVC stream residing in the DPB, output-time (1_of_M), equals the decompression time of the $N^{th}$ picture plus one picture-output interval. That is, it is at the next picture-output time, thus output(1_of_M)=decode-time (N_of_N)+1.

The M decompressed pictures in the DPB with successive output times may have been in successive order in the first AVC stream 300. In one embodiment, the corresponding compressed M pictures were not in successive order in the first AVC stream 300.

The number of picture-output times from the decompression of the first of the N consecutive picture, decode-time (1_of_N), to the picture-output time of the last of the M pictures in the DPB, output-time(M_of_M), equals (N+M). Hence, there are (N+M) different pictures that are output from the first AVC stream up to the "suitable splice point." Each of the (N+M) different pictures has a respective output-time corresponding to one of (N+M) consecutive picture-output times, the first picture-output time being coincident with decode-time(1_of_N).

In one embodiment, a first AVC stream is required to exhibit the following properties at the location where the "suitable splice point" becomes effective:
1. An AVC decompression engine 222 (FIG. 2) that receives and decompresses a portion of the first AVC stream, that ends with the $N^{th}$ picture and includes the N consecutive pictures, must be able to:
   A. Output all of the N consecutive pictures between the (N+M) picture-output times starting with and including decode-time(1_of_N and ending with output-time (M_of_M), and
   B. Output (N+M) different pictures during these (N+M) consecutive picture-output times.
2. No picture in the first AVC stream prior to and including the $N^{th}$ picture must have an output time after output-time(M_of_M).

In summary, in one embodiment, a compression engine (e.g., encoder 111) or video processing device (e.g., splicer 112) may not provide a "suitable splice point" that results in a discontinuity or gap for any of the (M+N) picture-output times, possibly forcing a previously output picture to be output repeatedly (i.e., because the picture corresponding to a respective picture-output time was not in the first AVC stream prior to the "suitable splice point"). If a picture had an output time after output-time(M_of_M), it would reside in the DPB 297 and not be output. A video processing device and/or compression engine provides a message corresponding to a "suitable splice point" only if the corresponding location in the stream satisfies the above properties.

A splice operation of the first AVC stream to the second AVC stream is performed by a video splicing device (e.g., splicer 112, FIG. 2), located in the headend 110, network 130, or elsewhere, by using values of the first data element and second data element, N and M, respectively, provided in a message (e.g., message or information 302) in the bitstream 300 (i.e., the compressed video stream or AVC stream). The video splicing device 112 uses the N and M values to produce a third AVC stream comprising of a portion of the first AVC stream followed by the second AVC stream. The portion of the first AVC stream in the third AVC stream terminates at the location of the first AVC stream after the $N_{th}$ picture. The first picture of the second AVC stream (FPOSAS) that follows the $N_{th}$ picture in the third stream is referred to as the FPOSAS-picture. The video splicing device 112 produces the third AVC stream with an overlapped transition period of M picture-output times. That is, the video splicing device 112 produces the third AVC stream such that following four conditions are met:
1. the M pictures from the first AVC stream with successive output times and residing in the DPB buffer at a "suitable splice point," are assigned a respective output (or display) time for each of the M picture-output times in accordance with their original output order,
2. None of the pictures from the first AVC stream are decompressed during the overlapped transition period. That is, the latest decode time assigned to a picture from the first AVC stream is prior to the start of the overlapped transition period.
3. M pictures from the second AVC stream, starting with the FPOSAS-picture, are decompressed during the overlapped transition period.
4. None of the pictures from the second AVC stream are output during the overlapped transition period. The earliest picture-output time assigned to a picture from the second AVC stream is one picture-output time after the end of the overlapped transition period.

Referring to FIG. 4, shown is a block diagram that illustrates, generally, picture interdependencies in an example video sequence of compressed pictures provided by the encoder 111, and more specifically, the conditions described above. The first row 402 of FIG. 4 comprises the output order of an exemplary GOP, such as received and decoded in decode order 404 (i.e., transmission order) at the decompression engine 222. The GOP comprises a sequence of compressed pictures (designated by picture types, such as I, P, or B). The picture interdependencies are shown, in part, by the arrows above and below each picture (pictures numbered 1-25 at the top of each respective picture). An arrow tail shown at a picture depicts that that picture serves as a reference picture to the other picture where the corresponding arrow head is shown. That is, the arrow conveys that the other picture is predicted from the reference picture. For instance, in FIG. 4, picture 3 is predicted from (and hence depends from) picture 1 and picture 5. Although shown described having a similar pattern of dependency between bounds (e.g., between pictures 1 and 9, and pictures 9 and 17), one having ordinary skill in the art should appreciate that different patterns and/or dependencies can be found from one bounded group to the next.

Beneath row 402 of FIG. 4 is the decode order 404, corresponding to the order in which the pictures are decoded for reconstruction at the decompression engine 222. The transmission order of pictures is different than the output or display order due to the need to have the reference pictures prior to decoding a picture. Note that P pictures can be forward predicted or backwards predicted, and typically, that fact is not evident until the pictures are decoded. For instance, knowledge of the picture type (e.g., as ascertained by a header) does not necessarily convey how prediction is employed or picture interdependencies.

Beneath row 404 is section 406, which illustrates the machine state of the DPB 297, sorted (from top to bottom in 406) in order of output from the DPB 297. Below section 406 is row 408, which provides a value for M. For instance, it is noted that potential splice points 410 and 412 each follow a machine state of the DPB 297 that comprises three (M=3) pictures in consecutive output order (e.g., $B_7$, $b_8$, $P_9$ for potential splice point 410 and $B_{15}$, $b_{16}$, and $P_{17}$ for potential splice point 412). In some embodiments, other values of M correspond to potential splice points.

The third AVC stream is received by DHCT 200 and decompression is performed on the compressed picture of the third AVC stream by decompression engine 222. DHCT 200 is an example of a receiver that houses a decoder (i.e., a decoding device, such as decompression engine 222). Decompressed pictures are stored in the decompression memory 299. The output system 248 serves to output (e.g., to display device 140) the decompressed pictures at their respective output times. Orchestration of decompression and outputting of pictures is performed according to the respective decode-time and output-time of each picture in the third AVC stream. When the portion of the third AVC stream corresponding to the spliced first and second AVC streams is processed by decompression engine 222, the overlapped transition period comes into effect. During the overlapped transition period, decompression engine 222 decompresses M consecutive pictures that emanated from the second AVC stream while outputting the last M pictures from the first AVC stream.

In one embodiment, at least one of the N consecutive pictures prior to the identified "suitable splice point" in the first AVC stream is also one of the M decompressed pictures of the first AVC stream in the DPB 297 with successive output times at the time that the "suitable splice point" becomes effective.

In one embodiment, N is required to be greater than M to announce the "suitable splice point" in the first AVC stream with sufficient lead time before it becomes effective. In an alternate embodiment, N>M and N is also greater than a pre-specified threshold (e.g., three picture-output intervals or picture-output times). In yet another embodiment, the same "suitable splice point" is announced N times with respective messages corresponding respectively to each of the N consecutive picture in the first AVC stream. That is, starting with the first of the N consecutive in the first AVC stream, N instances of messages is provided in the video stream, each instance corresponding respectively to one of the N consecutive pictures. The information in the message conveys respective values for the first data element and second data element as necessary to provide an indication of a potential or "suitable splice point." The first data element's value is N for the first picture and decreases by one successively in each successive instance of the message and corresponds to each one of the successive access units in the sequence of N consecutive access units. The first data element's value, N, finally becomes equal to one for the $N^{th}$ picture. The second data element's value remains constant, equal to M, through the N successive instances of the message that respectively corresponds to the N consecutive pictures. Two "different devices" may use two different announced messages that convey a potential splice point in the first AVC stream to prepare and perform the transition to the second AVC stream at the identified location of the "suitable splice point" of the first AVC stream. A third "video splicing device" may use more than one, and possibly all N instances of messages to prepare and perform the transition.

In one embodiment, the video splicing device that produces the third AVC stream sets the decompression time for the FPOSAS-picture equal to output-time(1_of_M), which is also equal to the decode-time(N_of_N)+1.

In one embodiment, the video splicing device 112 provides the FPOSAS-picture with an output time equal to M picture-output times after its decompression time and the FPOSAS-picture serves as a past reference picture to at least one picture with a decode-time greater than the decode-time of the FPOSAS-picture. Thus, M picture-output times are added to the decode-time of the FPOSAS-picture. In another embodiment, the FPOSAS-picture in the third AVC stream is provided a picture-output time less than M picture-output times after its decompression time, forcing a shortened overlapped transition period and at least one of the M pictures from the portion of the first AVC stream to not be displayed. In yet another embodiment, the output time of the FPOSAS-picture is greater than or equal to (M+1) picture-output times after its decode-time, and the FPOSAS-picture serves as a future reference picture to at least one picture with a decode-time greater than the decode-time of the FPOSAS-picture, including the picture from the second AVC stream that has an output time equal M picture-output times after the decompression time of the FPOSAS-picture.

The FPOSAS-picture in the third AVC may be an IDR-picture. In another embodiment, the FPOSAS-picture in the third AVC may be an IDR-picture or an I-picture. In yet another embodiment, the FPOSAS-picture in the third AVC stream is an I-picture.

In one embodiment, a compression engine 111 that produces the first AVC stream provides each picture in the first AVC stream with their respective picture-output time delayed by one picture-output interval to cause the value of M to be increased by one. Although the maximum number of reference pictures that can be retained in the DPB 297 is reduced by one, it benefits the splicing operation by lengthening the overlapped transition period from the first AVC stream to the second AVC stream by one picture-output interval. The longer overlapped transition period tends to reduce any potential increase in the bit-rate of the third AVC stream that may manifest as a result of starting compression at the FPO-SAS-picture without the benefit of reference pictures.

In an alternate embodiment, the video splicing device 112 provides a longer overlapped transition period by causing the last picture output from the portion of the first AVC stream to be output repeatedly over one or more extra picture-output intervals and setting the respective picture-output times for the pictures from the portion of the second AVC stream accordingly.

In one embodiment, the video splicing device 112 producing the third AVC stream retains in the bitstream the original information that conveyed the "suitable splice point" for the first AVC stream. The third AVC stream may then be spliced at a later time at the location in the third AVC stream where the "suitable splice point" becomes effective. Thus the portion of the third AVC stream containing the first AVC stream can be retained and the portion corresponding to the second AVC stream can be overwritten, in part or in its entirety, starting with the FPOSAS-picture. As a non-limiting example, when the second AVC stream corresponds to a first commercial, this allows for another splice operation to be performed to overwrite the second AVC stream by a fourth AVC stream that corresponds to a second commercial. The stream splicing operation from the third AVC stream to the fourth AVC stream can be performed by a different video splicing device than the one that produced the third AVC video stream. The produced fifth AVC stream comprises of the portion of the first AVC stream in the third AVC stream followed by the fourth AVC stream.

In one embodiment, the video splicing device producing the third AVC stream uses the additional information for the "suitable splice point", to perform and enhance the splicing of the first and second AVC streams.

In one embodiment, a message conveying a "suitable splice point" and corresponding to the first of N consecutive pictures in the first AVC stream also includes a third data element that provides a value corresponding to P consecutive pictures prior to, but not including, the first of N consecutive pictures (i.e., the identified picture). Whereas N conveys the location in the first AVC stream where the "suitable splice point" becomes effective, P conveys the number of consecutive pictures in the first AVC stream that must be decompressed prior to the first of the N consecutive pictures so that all (N+M) pictures can be output with their complete information. For instance, if a user has merely started receiving a broadcast video program, it may not be possible to obtain all the information to decompress some pictures that depend on reference pictures that were transmitted prior to when the user started receiving the program. Likewise, some pictures may indirectly depend on some reference pictures that are not available. In an alternate embodiment, P may be the number of pictures that must be decompressed prior to the $N^{th}$ picture, and P>N. In another embodiment, P pictures must be decompressed to guarantee the output with complete information of the M pictures in the DPB.

In yet another embodiment, a message conveying information for a potential (i.e., suitable) "splice point" is only provided at a location in the AVC stream that guarantees the output with complete information of the M pictures in the DPB. Alternatively, it is only provided at a location in the AVC stream that guarantees the output with complete information of the (N+M) pictures.

Conveyance of Suitable Splice Points in the Bitstream

Figure 5:
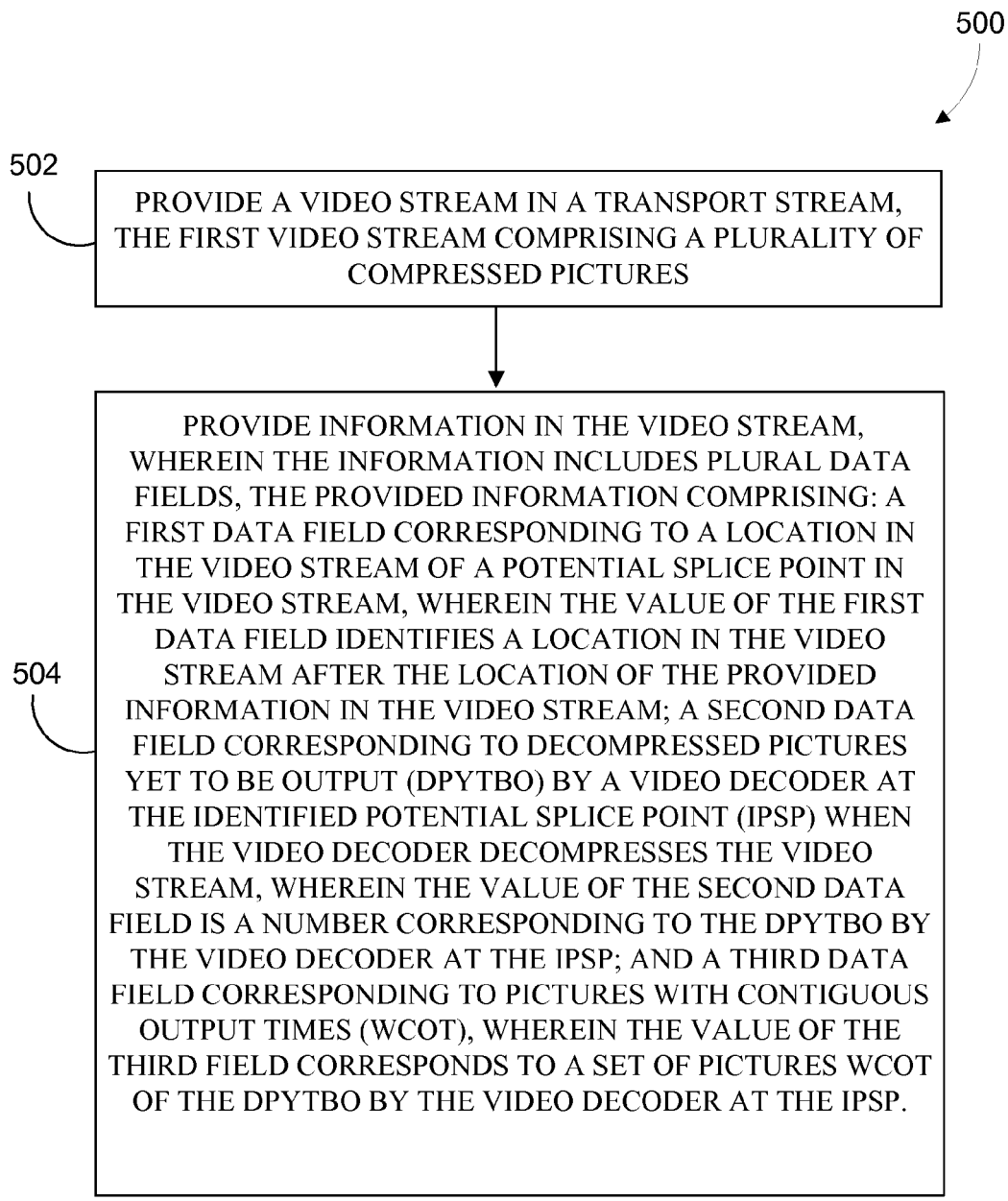
FIG. 5 is a flow diagram that illustrates an example method embodiment that conveys information in a video stream from an encoder to one or more video processing devices.
Figure 6:
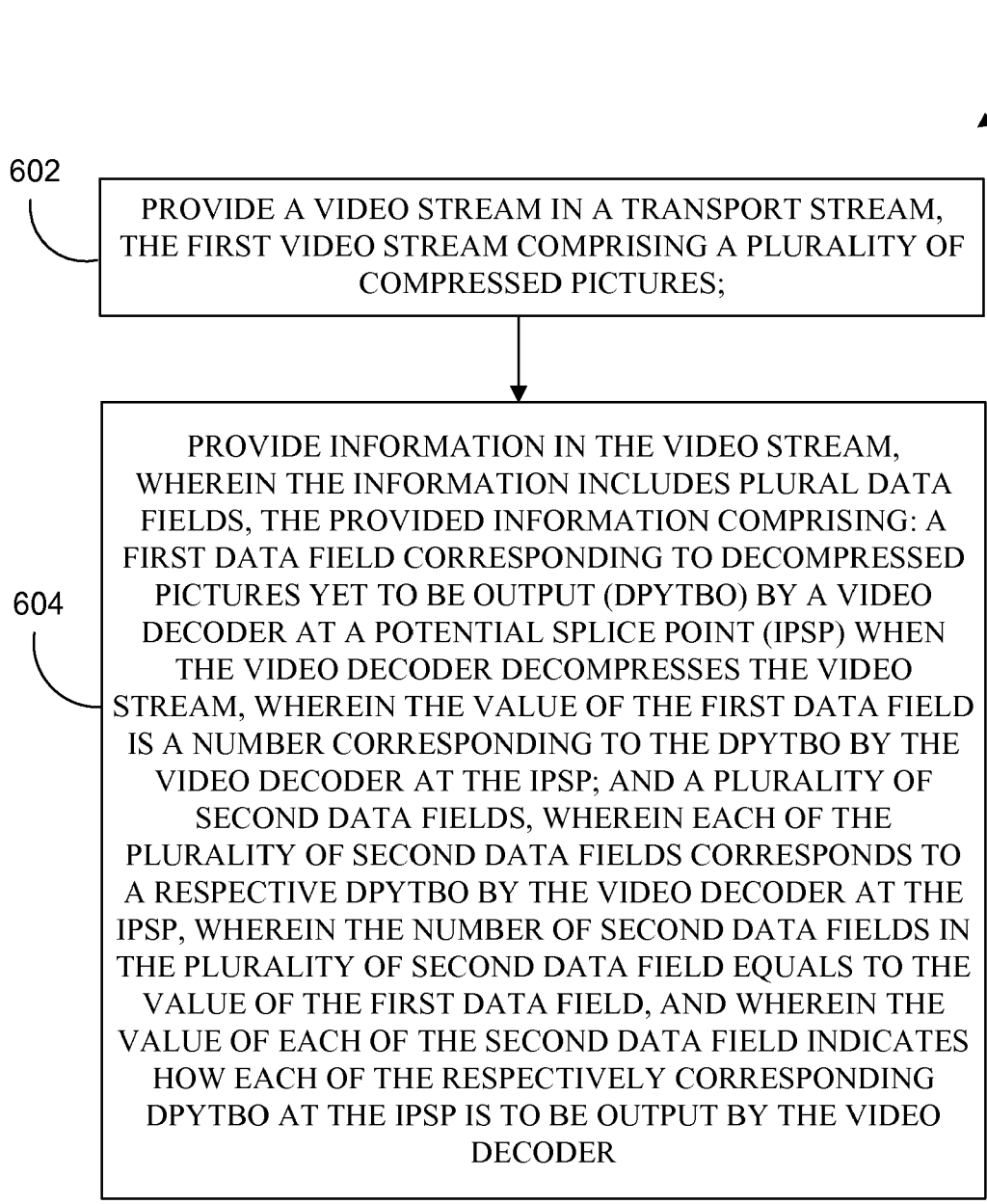
FIG. 6 is a flow diagram that illustrates another example method embodiment that conveys information in a video stream from an encoder to one or more video processing devices.
Figure 7:
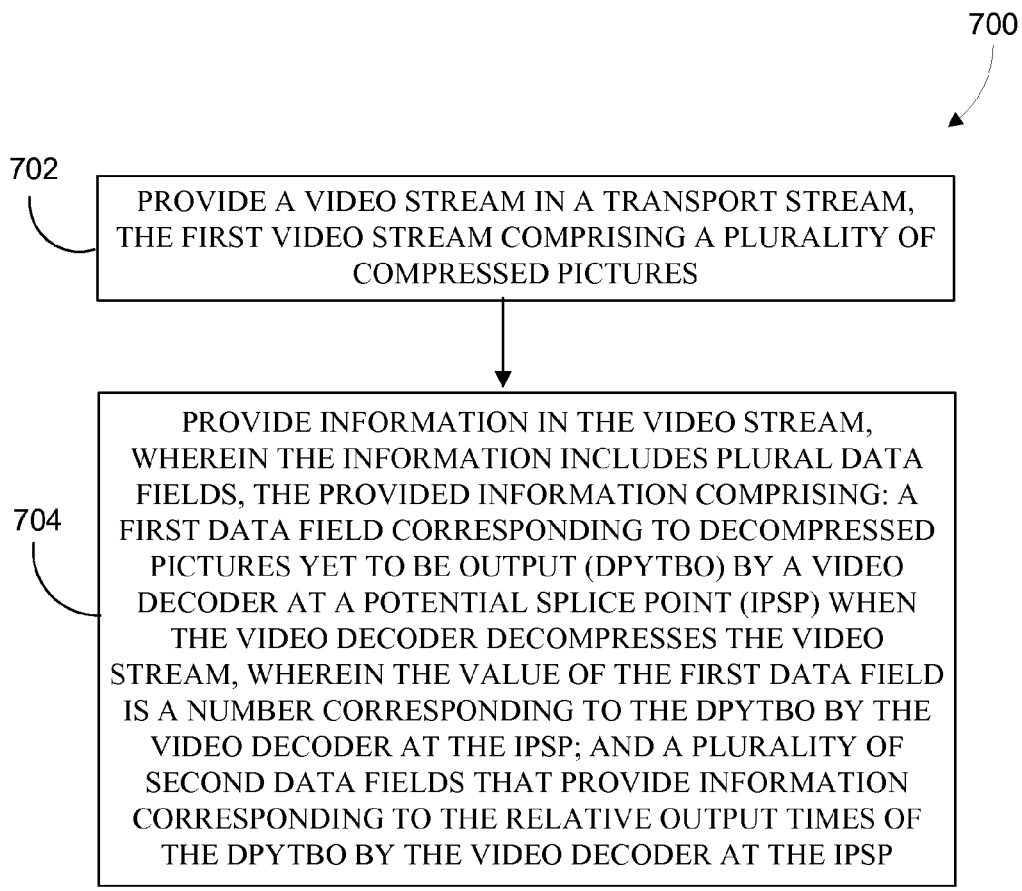
FIG. 7 is a flow diagram that illustrates another example method embodiment that conveys information in a video stream from an encoder to one or more video processing devices.
Figure 8:
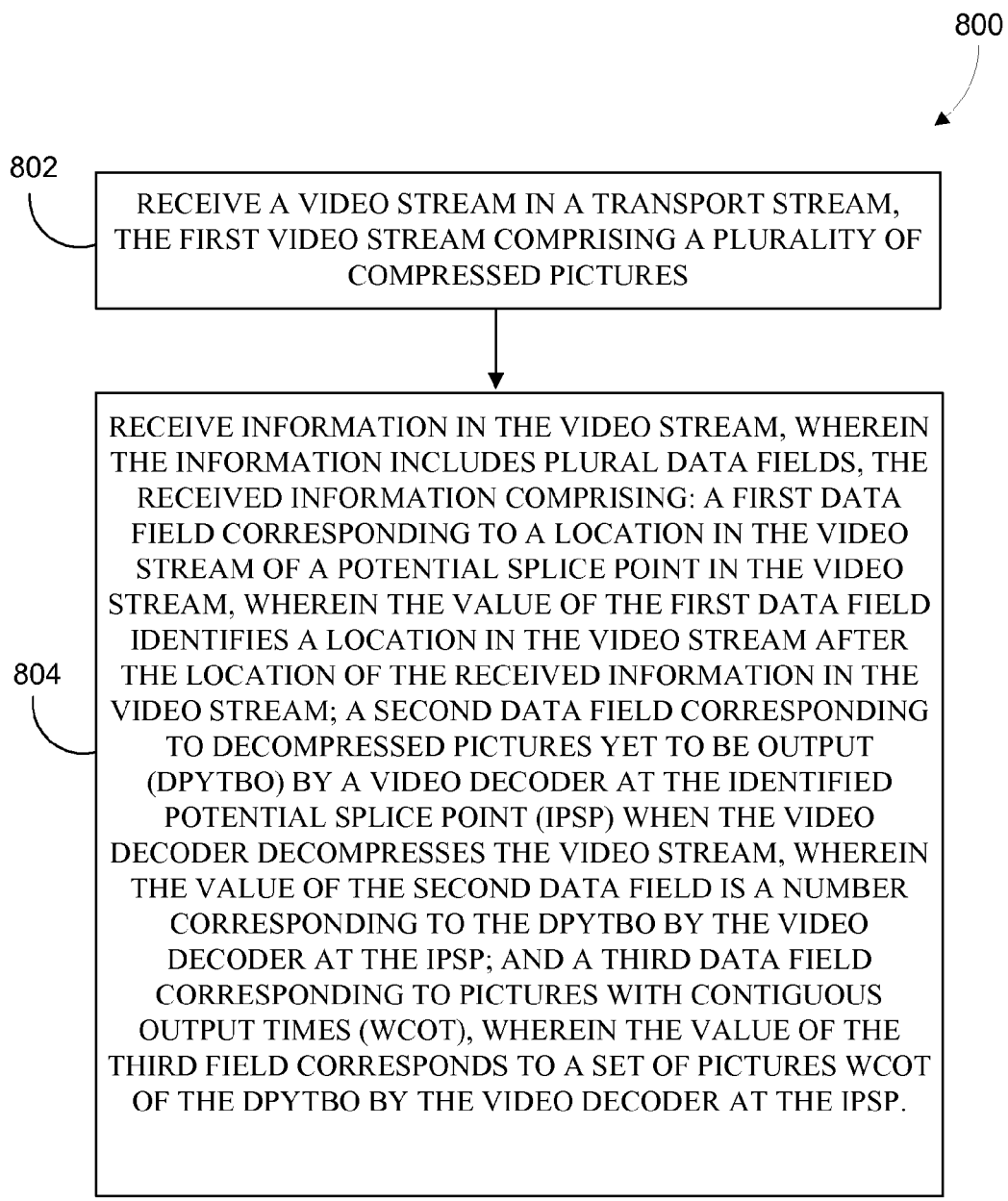
FIG. 8 is a flow diagram that illustrates an example method embodiment that receives information in a video stream at a video processing device.
Figure 9:
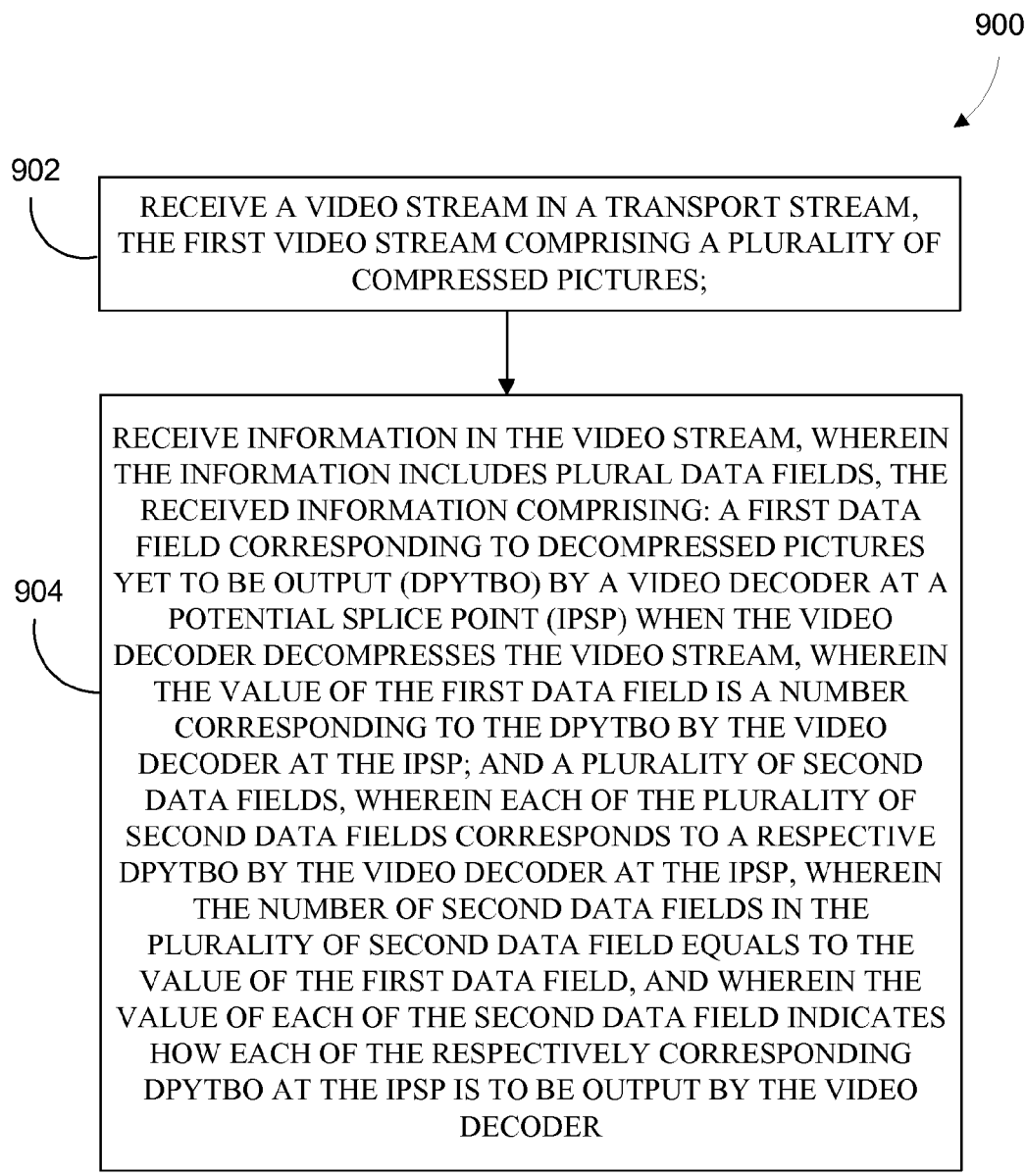
FIG. 9 is a flow diagram that illustrates another example method embodiment that receives information in a video stream at a video processing device.
Figure 10:
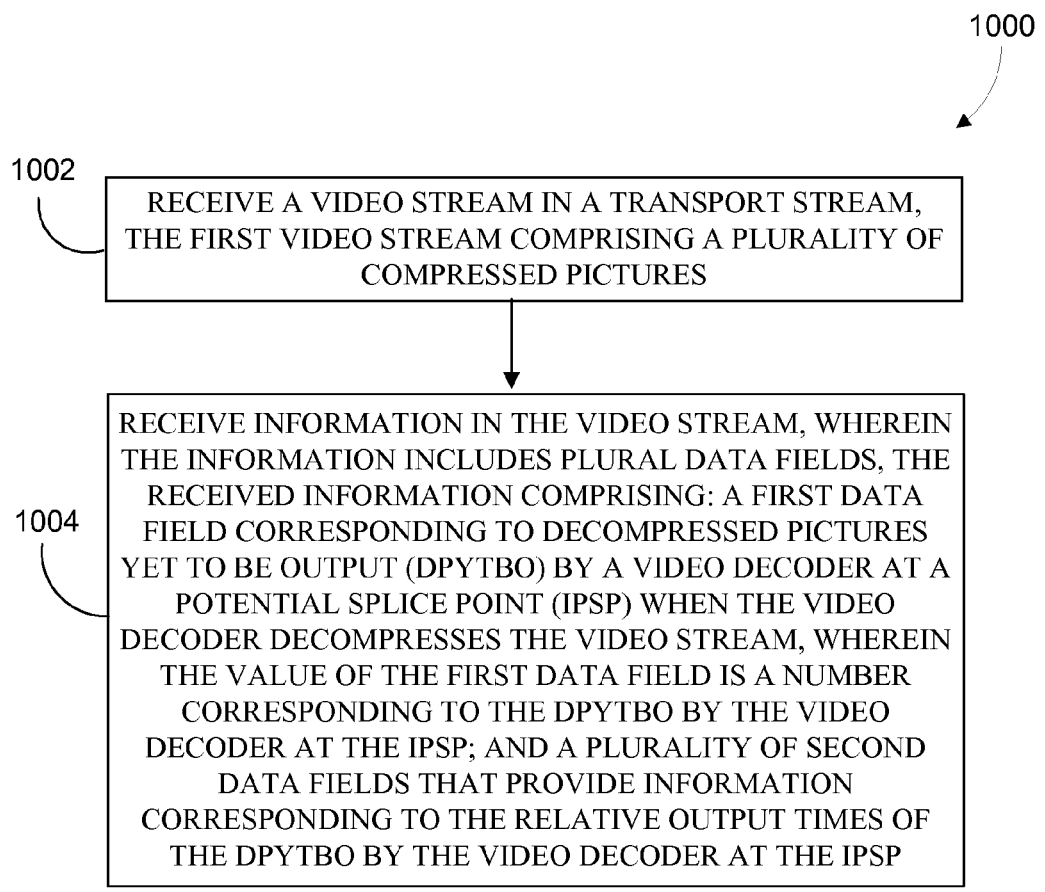
FIG. 10 is a flow diagram that illustrates another example method embodiment that receives information in a video stream at a video processing device.

Having provided a general overview for the various systems and methods described herein, attention is directed to FIGS. 5-7 and FIGS. 8-10. FIGS. 5-7 are flow diagrams that illustrate example methods implemented in one embodiment by the encoder 111 to convey information (e.g., messages) to a splicer 112, the information including a cue to potential splice points and/or the machine state of pictures in the DPB 297. FIGS. 8-10 are flow diagrams that illustrate example methods, implemented in one embodiment by a splicer 112, that receive and process the information and video stream provided by the encoder 111 to assist in the concatenation (splicing) process. In general, one or more embodiments of the example methods provide (or receive) a message conveying a potential splice point in the bitstream located N access units from the location in the bitstream of the message or the current access unit. The message also conveys for the identified splice point the number of access units in the DPB 297 (decoded picture buffer at the decoder), M, as explained above. A splicing device (e.g., splicer 112) may use the identified splice point to concatenate two bitstreams, imparting at the decoder 222 a splice transition period that spans M picture output intervals. During the splice transition period at the decoder 222, a picture from the first bitstream is output from the DPB 297 while each decoded picture from the second bitstream enters the DPB 297.

The provided message may serve as a cue that would be provided by the encoder 111 to convey a suitable splice point in the bitstream to the splicing device 112 (e.g., the receiving device). The splicing device 112, in one embodiment, may implement a method of receiving the provided message, interpreting the information in the provided message to determine whether to exercise initiating and splice operation at an identified potential splice point. The splicing device 112 performs a splicing operation based on one or more received messages, each containing information pointing to distinctive splice points in the bitstream. In another embodiment, several messages are received at the splicing device 112 but one or more of the messages point to the same splice point in the bitstream.

A splice point is located N access units from the current access unit or the location from where the message is located in the bitstream. Herein, a potential splice point is characterized as: (1) a location in the bitstream in which M pictures in the DPB have successive picture-output times, and (2) the earliest output time of the M pictures equals the output time immediately after the decode time of the $N^{th}$ picture (e.g., the decode time of the $N^{th}$ picture plus one picture-output interval).

The splicing device 112 that uses the received message (e.g., 302, FIG. 3) can use the information to cause a transition period at the decoder 222 in which pictures from the first bitstream in the DPB 297 are output while pictures from the second bitstream are decoded and stored in the DPB.

As N identifies the location of a potential splice point in the bitstream, it may be expressed in the message in one of different forms that connotes the number of consecutive frames, access units, or slices in the bitstream to identify the location of a suitable splice point from the location of the provided message. Different embodiments expressing N differently, as shown below. One method does not convey N in the message but M only.

A potential splice point may be announced in one or more, and possibly all of the N access units (i.e., an access unit is a distinct encoded picture in the compressed video stream, or bitstream, that precedes the location of the potential splice point). The value of N is decremented in successive instances of the message in consecutive access units in the bitstream that precede the identified splice point The splicing device or splicer 112 may use an identified splicing point to produce a concatenation of two bitstreams. At the decoder 222, the concatenated bitstream exhibits a transition period that spans M picture-output times. As a picture from the first bitstream is output from the DPB 297 during the transition period, a corresponding picture from the second bitstream is decoded and stored in the DPB. A decoded picture from the second bitstream can occupy the DPB vacancy created from outputting the picture from first bitstream. The splicer 112 may include MMCOs (memory management and control operations that remove a decoded picture that resides in the DPB) to remove some or all of the pictures of the first bitstream from the DPB 297. However, in some embodiments, the splicer 112 may start the second bitstream with an IDR and make proper use of no_output_of_prior_pics_flag.

The earliest picture-output time assigned to a picture from the second bitstream by the splicer 112 is one picture-output time after last output picture from the first bitstream. However, it should be noted that in some embodiments, the splicer 112 may opt to use an identified splice point but use a transition period less than M. Likewise, the DPB 297 may have more than M pictures at the identified splice point and the splicer 112 may need to employ MMCOs.

Some example message syntaxes corresponding to the conveyed information are presented below from which various method and system embodiments are contemplated.

Splice Point Cue1 Message Syntax

| splice_point_cue1( payloadSize ) { | C | Descriptor |
|---|---|---|
| N_num_fields_to_prior_pics_dpb_output | 5 | u(8) |
| M_num_fields__dpb_output_delay | 5 | u(5) |
| num_prior_pics_in_dpb | 5 | u(5) |
| for (j = 0; j < num_prior_pics_in_dpb; j++) { | | |
| consecutive_poc_flag[ i ] | 5 | u(1) |
| pic_struct[ i ] | 5 | u(3) |
| } | | |
| } | | |

Splice Point Cue1 Message Semantics

The splice point cue1 message is intended to provide early cues for pre-conditioned splice points. This message may provide early cues to assist digital program insertion. Concatenation devices may make use of this information to generate the IDR prior pictures output cue message.

N_num_fields_to_prior_pics_dpb_output specifies the time, in field output time units, from decoding of current access unit to the decoding of access unit immediately prior to the indicated splice point to which this message applies.

M_num_fields_dpb_output_delay specifies the time, in field output time units, from first picture to last picture in DPB exhibiting contiguous output times and with the first picture having output time equal to N_num_fields_to_prior_pics_dpb_output+2. A frame is considered 2 fields' time.

num_prior_pics_in_dpb indicates the number of prior pictures remaining in the DPB to be output after the decoding of the associated access unit prior to the indicated splice point. Not all pictures in the DPB may have consecutive output times.

consecutive_poc_flag[i] equal to 1 indicates that the picture has a consecutive picture order count as compared to previous picture output from the DPB. Picture order counts are consecutive if the increments are 1 for field pictures and 2 for frame pictures, or the pictures are intended to be output without gaps. The pictures are sorted by corresponding picture order counts from smallest value to highest value.

pic_struct[i] indicates the pic_struct value that is associated with each picture. The pictures are sorted by corresponding picture order counts from smallest value to highest value.

Splice Point Cue2 Message Syntax

| splice_point_cue2( payloadSize ) { | C | Descriptor |
|---|---|---|
| N_num_AU_to_prior_pics_dpb_output | 5 | u(8) |
| M_num_AU__dpb_output_delay | 5 | u(5) |
| num_prior_pics_in_dpb | 5 | u(5) |
| for (j = 0; j < num_prior_pics_in_dpb; j++) { | | |
| consecutive_poc_flag[ i ] | 5 | u(1) |
| pic_struct[ i ] | 5 | u(3) |
| } | | |
| } | | |

Splice Point Cue2 Message Semantics

The splice point cue2 message is intended to provide early cues for pre-conditioned splice points. This message may provide early cues to assist digital program insertion. Concatenation devices may make use of this information to generate an IDR prior pictures output cue message.

N_num_AU_to_prior_pics_dpb_output specifies the number of access units, from decoding of current access unit to the decoding of access unit immediately prior to the indicated splice point to which this message applies.

M_num_AU_dpb_output_delay specifies the number of access units in DPB with contiguous output times. The first picture has output time equal to N_num_fields_to_prior_pics_dpb_output+2.

num_prior_pics_in_dpb indicates the number of prior pictures remaining in the DPB to be output after the decoding of the associated access unit prior to the indicated splice point. Not all pictures in the DPB may have consecutive output times.

consecutive_poc_flag[i] equal to 1 indicates that the picture has a consecutive picture order count as compared to previous picture output from the DPB. Picture order counts are consecutive if the increments are 1 for field pictures and 2 for frame pictures, or the pictures are intended to be output without gaps. The pictures are sorted by corresponding picture order counts from smallest value to highest value.

pic_struct[i] indicates the pic_struct value that is associated with each picture. The pictures are sorted by corresponding picture order counts from smallest value to highest value.

Splice Point Cue3 Message Syntax

| splice_point_cue3( payloadSize ) { | C | Descriptor |
|---|---|---|
| N_num_AU_to_prior_pics_dpb_output | | u(8) |
| M_num_AU__dpb_output_delay | 5 | u(4) |
| num_prior_pics_in_dpb | | u(4) |
| last_pic_before_splice_POC | 5 | u(32) |
| if( CpbDpbDelaysPresentFlag ) { | | |
| splice_pic_initial_buffering_delay | 5 | u(v) |
| splice_pic_dpb_output_delay | 5 | u(v) |
| } | | |
| } | | |

Splice Point Cue3 Message Semantics

The splice point cue3 message is intended to provide early cues for pre-conditioned splice points. This message may provide early cues to assist digital program insertion. Concatenation devices may make use of this information to generate an IDR prior pictures output cue message.

N_num_frames_to_prior_pics_dpb_output specifies the number of frames, from decoding of current frame to the decoding of frame immediately prior to the indicated splice point to which this message applies.

M_num_frames_dpb_output_delay specifies the number of frames in DPB with contiguous output times. The first frame has output time equal to N_num_frames_to_prior_pics_dpb_output+2.

num_prior_frames_in_dpb indicates the number of frames remaining in the DPB to be output after the decoding of the associated frame prior to the identified potential splice point. Not all pictures in the DPB may have consecutive output times.

last_frame_before_splice_POC specifies the picture order count of the frame prior to the identified splice point.

splice_pic_initial_buffering_delay specifies the initial buffering delay effective at the picture in the stream immediately after the identified splice point.

splice_pic_dpb_output_delay specifies the DPB output delay (e.g., PTS-DTS) effective at the picture in the stream immediately after the identified splice point.

Splice point DPB Cue4 Message Syntax

| splice_point_DPB_cue4( payloadSize ) { | C | Descriptor |
|---|---|---|
| num_prior_pics_in_dpb | 5 | u(5) |
| for (j = 0; j < num_prior_pics_in_dpb; j++) { | | |
|   consecutive_poc_flag[ i ] | 5 | u(1) |
|   pic_struct[ i ] | 5 | u(3) |
| } | | |

Splice Point DPB Cue4 Message Semantics

The splice point DPB cue message is intended to provide DPB cues for pre-conditioned splice points. The message shall contain information of the DPB state after completion of the DPB process as described in clause C.2 of ITU Recommendation H.264 for the associated access unit. This message may provide cues to assist digital program insertion. Concatenation devices may make use of this information to generate IDR prior pictures output cue message.

num_prior_pics_in_dpb indicates the number of prior pictures remaining in the DPB to be output after the decoding of the associated access unit.

consecutive_poc_flag[i] equal to 1 indicates that the picture has consecutive picture order count as compared to previous picture output from the DPB. Picture order counts are consecutive if the increments are 1 for field pictures and 2 for frame pictures, or the pictures are intended to be output without gaps. The pictures are sorted by corresponding picture order counts from smallest value to highest value.

pic_struct[i] indicates the pic_struct value that is associated with each picture. The pictures are sorted by corresponding picture order counts from smallest value to highest value.

Having described some example message syntaxes, it should be appreciated that one method embodiment, shown in FIG. 5 and denoted as method 500, comprises providing a video stream in a transport stream, the first video stream comprising a plurality of compressed pictures (502), and providing information in the video stream, wherein the information includes plural data fields, the provided information comprising: a first data field corresponding to a location in the video stream of a potential splice point in the video stream, wherein the value of the first data field identifies a location in the video stream after the location of the provided information in the video stream; a second data field corresponding to decompressed pictures yet to be output (DPYTBO) by a video decoder at the identified potential splice point (IPSP) when the video decoder decompresses the video stream, wherein the value of the second data field is a number corresponding to the DPYTBO by the video decoder at the IPSP; and a third data field corresponding to pictures with contiguous output times (WCOT), wherein the value of the third field corresponds to a set of pictures WCOT of the DPYTBO by the video decoder at the IPSP (504).

Another method embodiment, shown in FIG. 6 and denoted as method 600, comprises providing a video stream in a transport stream, the first video stream comprising a plurality of compressed pictures (602), and providing information in the video stream, wherein the information includes plural data fields, the provided information comprising: a first data field corresponding to decompressed pictures yet to be output (DPYTBO) by a video decoder at a potential splice point (IPSP) when the video decoder decompresses the video stream, wherein the value of the first data field is a number corresponding to the DPYTBO by the video decoder at the IPSP; and a plurality of second data fields, wherein each of the plurality of second data fields corresponds to a respective DPYTBO by the video decoder at the IPSP, wherein the number of second data fields in the plurality of second data field equals to the value of the first data field, and wherein the value of each of the second data field indicates how each of the respectively corresponding DPYTBO at the IPSP is to be output by the video decoder (604).

Another method embodiment, shown in FIG. 7 and denoted as method 700, comprises providing a video stream in a transport stream, the first video stream comprising a plurality of compressed pictures (702), and providing information in the video stream, wherein the information includes plural data fields, the provided information comprising: a first data field corresponding to decompressed pictures yet to be output (DPYTBO) by a video decoder at a potential splice point (IPSP) when the video decoder decompresses the video stream, wherein the value of the first data field is a number corresponding to the DPYTBO by the video decoder at the IPSP; and a plurality of second data fields that provide information corresponding to the relative output times of the DPYTBO by the video decoder at the IPSP (704).

In addition, one having ordinary skill in the art, in the context of the present disclosure, should appreciate that receive-side (e.g., at a video processing device such as the splicer 112) method embodiments are contemplated that largely mirror the transmit-side methods described above in association with FIGS. 5-7. Accordingly, one method embodiment, shown in FIG. 8 and denoted as method 800, comprises receiving a video stream in a transport stream, the first video stream comprising a plurality of compressed pictures (802), and receiving information in the video stream, wherein the information includes plural data fields, the received information comprising: a first data field corresponding to a location in the video stream of a potential splice point in the video stream, wherein the value of the first data field identifies a location in the video stream after the location of the received information in the video stream; a second data field corresponding to decompressed pictures yet to be output (DPYTBO) by a video decoder at the identified potential splice point (IPSP) when the video decoder decompresses the video stream, wherein the value of the second data field is a number corresponding to the DPYTBO by the video decoder at the IPSP; and a third data field corresponding to pictures with contiguous output times (WCOT), wherein the value of the third field corresponds to a set of pictures WCOT of the DPYTBO by the video decoder at the IPSP (804).

Another method embodiment, shown in FIG. 9 and denoted as method 900, comprises receiving a video stream in a transport stream, the first video stream comprising a plurality of compressed pictures (902), and receiving information in the video stream, wherein the information includes plural data fields, the received information comprising: a first data field corresponding to decompressed pictures yet to be output (DPYTBO) by a video decoder at a potential splice point (IPSP) when the video decoder decompresses the video stream, wherein the value of the first data field is a number corresponding to the DPYTBO by the video decoder at the IPSP; and a plurality of second data fields, wherein each of the plurality of second data fields corresponds to a respective DPYTBO by the video decoder at the IPSP, wherein the number of second data fields in the plurality of second data field equals to the value of the first data field, and wherein the value of each of the second data field indicates how each of the respectively corresponding DPYTBO at the IPSP is to be output by the video decoder (904).

Another method embodiment, shown in FIG. 10 and denoted as method 1000, comprises receiving a video stream in a transport stream, the first video stream comprising a plurality of compressed pictures (1002), and receiving information in the video stream, wherein the information includes plural data fields, the received information comprising: a first data field corresponding to decompressed pictures yet to be output (DPYTBO) by a video decoder at a potential splice point (IPSP) when the video decoder decompresses the video stream, wherein the value of the first data field is a number corresponding to the DPYTBO by the video decoder at the IPSP; and a plurality of second data fields that provide information corresponding to the relative output times of the DPYTBO by the video decoder at the IPSP (1004).

In some embodiments, additional (or fewer) steps for one or more of the above-described methods are contemplated to be within the scope of the disclosure.

Further, one having ordinary skill in the art, in the context of the present disclosure, should understand that any of the above methods may be considered without including explicitly the consecutive_poc_flag of each picture in the DPB and its pic_struct. Likewise, it should be understood, in the context of the present disclosure, that any of the above methods could be amended to include any of the syntax elements described in other parts of this disclosure or the sections entitled: Forewarning location of end_of_stream in spliced bitstreams, or/and in the section entitled: Method to control DPB output in non-seamless spliced bitstreams with end_of_stream.

Method to Control DPB Output in Non-Seamless Spliced Bitstreams with End_of_Stream Having described the conveyance of information between an encoder 111 and video processing device (e.g., splicer 112), attention is directed to certain system and/or method embodiments for providing, receiving, and/or processing of control information, the control information (or information) passed through by the splicer 112 from the encoder 111 in some embodiments, or generated by the splicer 112 (e.g., in response to the information received from the encoder 111 as described above) in some embodiments. Such control information enables a video processing device, such as the DHCT 200, to orchestrate the output of pictures from the DPB 297. The message according to the following description provides information to control the output of DPB pictures at the splice point of non-seamless concatenated bitstreams. For instance, and referring to FIG. 3, relevant to this discussion are machine states of the DPB 297 where M equals, for instance, two (2). The message can serve as a tool to splicing devices along with the end_of_stream NAL unit and no_output_of_prior_pics_flag. The message is provided in the bitstream prior to the end_of_stream NAL unit to identify its location and specify the output behavior of non-previously output pictures in the DPB 297 at the time that the end_of_stream NAL unit becomes effective. Information that specifies the output behavior of each non-previously output DPB picture allows for outputting a picture, not outputting, or outputting the picture for a number of consecutive times prior to outputting the subsequent picture from the first bitstream. The message may be signaled ahead with information that points to the location of the end_of_stream One method provides a message that serves as a cue that is provided by a splicing device 112 to a decoder 222 to convey information that alleviates the non-seamless transition to a concatenated stream. As described herein, the concept of N may be used to identify the location of a splice point in the bitstream and may be expressed in the message in one of different forms that connotes the number of consecutive frames, access units, or slices in the bitstream to identify the location of the splice point from the location of the message. Different method embodiments for expressing N in the message are disclosed herein. One method embodiment does not convey N but only information to control the output of pictures.

A potential splice point may be announced in one or more, and possibly all of the N access units preceding the location of the splice point. The value of N is decremented in successive instances of the message in consecutive access units that precede the splice point A decoder, such as decoder or decompression engine 222, may use the provided message to alleviate the effects of a non-seamless concatenation of two bitstreams. At the decoder 222, the concatenated bitstream exhibits a transition period that spans M picture-output times. As a picture from the first bitstream is output from the DPB 297 during the transition period, control information specifies the outputting of each picture. Outputting may be consistent with pic_struct, but for an interlaced source, the splicing device 112 provides information to prohibit the manifestation of motion jitter. Hence, for an interlaced source, the last output field of an interlaced frame is output, as both the top and bottom fields, to satisfy the repetition amount specified by the output cue in the message.

In similar fashion to the disclosure above, some example syntaxes are provided below, from which various systems and methods are contemplated that convey or receive such information and process the same.

IDR Prior Pictures Output Cue Message Syntax

| IDR_prior_pic_output_cue( payloadSize ) { | C | Descriptor |
|---|---|---|
| use_no_output_of_prior_pics_flag | 5 | u(1) |
| num_prior_pics_in_dpb | 5 | u(5) |
| for (j = 0; j < num_prior_pics_in_dpb; j++) { | | |
| output_cue[ i ] | 5 | u(3) |
| } | | |

IDR Prior Pictures Output Cue Message Semantics

The IDR prior pic output cue message is intended to assist the decoder 222 in outputting prior pictures remaining in the DPB 297 from the previous bitstream across a concatenation. This message applies to the prior pictures output by the DPB process triggered by the decoding of an End_of_Stream NAL unit or an IDR access unit. The message shall be in the same access unit as the effected End_of_Stream NAL unit, or if there is no End_of_Stream NAL unit, in the same access unit as the effected IDR NAL. This message may be useful for digital program insertion applications. Further, it may help the decoder 222 to maintain continuous picture output for bitstreams having a discontinuous DPB output across concatenation points. In such applications, this message may be output by concatenation devices (e.g., splicer 112).

use_no_output_of_prior_pics_flag equal to 1 specifies that the decoder should use the no_output_of_prior_pics_flag as specified in the IDR access unit regardless of the inference rules as specified by [section x.x], and across End_of_Stream NAL unit.

num_prior_pics_in_dpb indicates the number of prior pictures remaining in the DPB 297 to be output during the decoding of the IDR access unit.

output_cue[i] indicates cues for the output of each prior picture in the DPB 297, according to Table X-X below. The pictures are sorted by corresponding picture order counts from smallest value to highest value. The decoder 222 may make use of the output cue for better visual experience.

TABLE X-X

| Value | Recommended output cue for picture |
|---|---|
| 0 | Picture may be discarded without output |
| 1 | Picture may be output according to picture's pic_struct* |
| 2 | Picture's output as indicated by pic_struct* may be repeated once |
| 3 | Picture's output as indicated by pic_struct* may be repeated twice |
| 4 | Picture's output as indicated by pic_struct* may be repeated indefinitely until first picture is output from DPB after the decoding of the IDR access unit |
| 5 ... 7 | Reserved |

Note (denoted by an asterisks) that for interlaced video sources, repetition may mean that the last output field of an interlaced frame is output as both the top and bottom fields to satisfy the number of repetitions specified by output cue. Alternatively, repetition by causing a field to be displayed for both and top fields may require the decoder 222 to perform anti-flicker or anti-fluttering filter on the output field. Alternatively, an instance of the field is output filtered (e.g., when the field is output as top field) and the second instance is not (e.g., bottom field). Or, the fields of an interlaced pictures may be de-interlaced by a de-interlacing method in the decoder 222.

Another example message syntax is as follows:

IDR Prior Pictures Output Cue Message Syntax

| IDR_prior_pic_output_cue( payloadSize ) { | C | Descriptor |
|---|---|---|
| num_prior_pics_in_dpb | 5 | u(5) |
| for (j = 0; j < num_prior_pics_in_dpb; j++) { | | |
| output_cue[ i ] | 5 | u(3) |
| } | | |

IDR Prior Pictures Output Cue Message Semantics

The IDR prior pic output cue message is intended to assist the decoder 222 in outputting prior pictures remaining in the DPB 297 from the previous bitstream across a concatenation. This message applies to the prior pictures output by the DPB process triggered by the decoding of an End_of_Stream NAL unit or an IDR access unit. The message shall be in the same access unit as the effected End_of_Stream NAL, or if there is no End_of_Stream NAL, in the same access unit as the effected IDR NAL. This message may be useful for digital program insertion applications. Further, it may help the decoder 222 to maintain continuous picture output for bitstreams having discontinuous DPB output across concatenation points. In such applications, this message may be output by concatenation devices.

num_prior_pics_in_dpb indicates the number of prior pictures remaining in the DPB 297 to be output during the decoding of the IDR access unit.

output_cue[i] indicates cues for the output of each prior picture in the DPB 297, according to Table X-X1. The pictures are sorted by corresponding picture order counts from smallest value to highest value. The decoder 222 may make use of the output cue for better visual experience.

TABLE X-X1

| Value | Recommended output cue for picture |
|---|---|
| 0 | Picture may be discarded without output |
| 1 | Picture may be output according to picture's pic_struct* |
| 2 | Picture's output as indicated by pic_struct* may be repeated once |
| 3 | Picture's output as indicated by pic_struct* may be repeated twice |
| 4 | Picture's output as indicated by pic_struct* may be repeated indefinitely until first picture is output from DPB after the decoding of the IDR access unit |
| 5 | Repeat picture output as indicated by pic_struct* until the output time of the next picture in the DPB. |
| 6 | Output the last picture once again* |
| 7 | Reserved |

Note (denoted by an asterisks) that for an interlaced video source, repetition may mean that the last output field of an interlaced frame is output as both the top and bottom fields to satisfy the number of repetitions specified by output cue. Alternatively, repetition by causing a field to be displayed for both and top fields may require the decoder 222 to perform anti-flicker or anti-fluttering filter on the output field. Alternatively, an instance of the field is output filtered (e.g., when the field is output as top field) and the second instance is not (e.g., bottom field). Or, the fields of an interlaced pictures may be de-interlaced by a de-interlacing method in the decoder 222.

Any of the above example syntax and corresponding methods of this section may be amended to include any of the syntax elements described in other parts of this disclosure or in the sections entitled: Forewarning location of end_of_stream in spliced bitstreams, or/and in Conveyance of suitable splice points in the bitstream.

Forewarning Location of End_of_Stream in Spliced Bitstreams

One method described below provides for transmitting or receiving a message that conveys the location of an end_of_stream NAL unit in the bitstream. The end_of_stream NAL unit is the last NAL unit in the access unit that ends a bitstream. In some system and/or method embodiments, a new bitstream may immediately follow that access unit that ended the bitstream. The provided message conveys an end of stream in the bitstream located N access units from the location of the message in the bitstream. The provided or received message may serve as a cue that can be provided by a splicing device 112 or other equipment to convey to a decoder, such as decoder 222, the location of the forthcoming end_of_stream NAL unit. The end_of_stream is located N access units from the current access unit or the location of the message.

As some receivers may potentially process and interpret non-VCL (non video coding layer) NAL units in the back-end, a decoder may use the information in the provided or received message to anticipate and plan a transition from a first to a second bitstream.

As N identifies the location of an end_of_stream NAL unit, it may be expressed in the message in one of different forms that connotes the number of consecutive frames, access units, or slices in the bitstream to identify the location of end_of_stream from the location of the provided or received message. Several syntax (and hence methods) of expressing N in the message are described below.

End_of_Stream Cue1 Message Syntax

| end_of_Stream_cue1( payloadSize ) { | C | Descriptor |
|---|---|---|
| N_num_fields_to_end_of_stream | 5 | u(8) |
| } | | |

End_of_Stream Cue1 Message Semantics

The end_of_stream cue1 message is intended to provide forewarning of the end_of_stream to allow ample time for decoders, such as decoder 222, to anticipate and plan a change from a first to a second bitstream.

N_num_fields_to_end_of_stream specifies the time, in field output time units, from decoding of current access unit to the decoding of access unit immediately prior to the end_of_stream to which this message applies.

End_of_Stream Cue2 Message Syntax

| end_of_Stream _cue2( payloadSize ) { | C | Descriptor |
|---|---|---|
| N_num_AU_to_end_of_stream | 5 | u(8) |
| } | | |

End_of_Stream Cue2 Message Semantics

The end_of_stream cue2 message is intended to provide forewarning of the end_of_stream to allow ample time for decoders to anticipate and plan a change from a first to a second bitstream.

N_num_AU_to_end_of_stream specifies the number of access units, from decoding of current access unit to the decoding of access unit immediately prior to the end_of_stream to which this message applies.

End_of_Stream Cue3 Message Syntax

| splice_point_cue3( payloadSize ) { | C | Descriptor |
|---|---|---|
| N_num_frames_to_end_of_stream | | u(8) |
| } | | |

End_of_Stream Cue3 Message Semantics

The end_of_stream cue3 message is intended to provide forewarning of the end_of_stream to allow ample time for decoders to anticipate and plan a change from a first to a second bitstream.

N_num_frame_to_end_of_stream specifies the number of frames, from decoding of current frame to the decoding of frame immediately prior to the end_of_stream to which this message applies.

Any of the above syntaxes (and hence corresponding methods) may be amended to include any of the syntax elements described in other parts of this document or in the section entitled: Method to control DPB output in non-seamless spliced bitstreams with end_of_stream, or/and in the section entitled: Conveyance of suitable splice points in the bitstream.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

Additionally, though the various methods are described above in the context of the implementation environment disclosed in FIGS. 1 and 2, it should be appreciated that other implementation environments are contemplated to be within the scope of the disclosure, and hence the various methods described herein are not limited to the environment in those figures.

It should be emphasized that the above-described embodiments of the present disclosure are merely possible examples of implementations, merely set forth for a clear understanding of the principles of the disclosure. Many variations and modifications may be made to the above-described embodiment(s), and all such modifications and variations are intended to be included herein within the scope of this disclosure and protected by the following claims.

The invention claimed is:

1. A method, comprising: receiving a video stream in a transport stream, the video stream comprising a plurality of compressed pictures; and receiving information in the video stream, wherein the information includes plural data fields, the received information comprising: a first data field corresponding to a location in the video stream of a potential splice point in the video stream, wherein a value of the first data field identifies a location in the video stream after the location of the received information in the video stream; a second data field corresponding to decompressed pictures yet to be output (DPYTBO) by a video decoder at the identified potential splice point (IPSP) when the video decoder decompresses the video stream, wherein the value of the second data field is a number corresponding to the DPYTBO by the video decoder at the IPSP; and a third data field corresponding to pictures with contiguous output times (WCOT), wherein the value of the third field corresponds to a set of pictures WCOT of the DPYTBO by the video decoder at the IPSP.

2. The method of claim 1, wherein the received information further comprises of a plurality of fourth data fields, wherein each of the plurality of fourth data fields corresponds to a respective DPYTBO by the video decoder at the IPSP, wherein the number of fourth data fields in the plurality of fourth data field equals to the value of the second data field, and wherein the value of each of the fourth data fields indicates whether the respectively corresponding DPYTBO is a picture WCOT.

3. The method of claim 1, wherein the received information further comprises of one or more fourth data fields, and wherein pictures WCOT at the IPSP can be determined by the video decoder from the one or more fourth data fields.

4. The method of claim 1, wherein the value of the third data field represents field output times.

5. The method of claim 2, wherein the received information further comprises of a plurality of fifth data fields, wherein each of the plurality of fifth data fields corresponds to a respective DPYTBO by the video decoder at the IPSP, wherein the number of fifth data fields in the plurality of fifth data field equals to the value of the second data field, and wherein the value of each of the fifth data fields indicates whether the output of each DPYTBO by the video decoder at the IPSP or a portion thereof is to be repeated.

6. The method of claim 1, wherein the value of the third data field represents a number of pictures.

7. The method of claim 1, the received information further comprises of a sixth data field, wherein the value sixth data field identifies the last picture in the set of pictures WCOT of the DPYTBO by the video decoder at the IPSP.

8. The method of claim 1, wherein the received information further comprises of a seventh data field, wherein the value of the seventh data field provides an initial delay of a compressed picture buffer at the IPSP when the video decoder decompresses the video stream.

9. The method of claim 1, wherein the received information further comprises of an eighth data field, wherein the value of the eighth data field provides an output picture delay of a decoded picture buffer at the IPSP when the video decoder decompresses the video stream.

10. The method of claim 8, wherein the received information further comprises of a eighth data field, wherein the value of the eighth data field provides an output picture delay of a decoded picture buffer at the IPSP when the video decoder decompresses the video stream.

11. The method of claim 1, wherein the received information in the video stream is provided in a message in the video stream.

12. A method, comprising: receiving a video stream in a transport stream, the video stream comprising a plurality of compressed pictures; and receiving information in the video stream, wherein the information includes plural data fields, the received information comprising: a first data field corresponding to decompressed pictures yet to be output (DPYTBO) by a video decoder at a potential splice point (IPSP) when the video decoder decompresses the video stream, wherein a value of the first data field is a number corresponding to the DPYTBO by the video decoder at the IPSP; and a plurality of second data fields, wherein each of the plurality of second data fields corresponds to a respective DPYTBO by the video decoder at the IPSP, wherein the number of second data fields in the plurality of second data field equals to the value of the first data field, and wherein the value of each of the second data field indicates how each of the respectively corresponding DPYTBO at the IPSP is to be output by the video decoder.

13. The method of claim 12, wherein the value of one of the plurality of the second data fields corresponds to foregoing the output of the picture corresponding to the respective second data field.

14. The method of claim 12, wherein the value of one of the plurality of the second data fields corresponds to allowing the output of the picture corresponding to the respective second data field to be repeated once.

15. The method of claim 13, wherein the value of another of the plurality of the second data fields corresponds to allowing the output of the picture corresponding to the respective second data field to be repeated twice.

16. The method of claim 12, wherein the value of one of the plurality of the second data fields corresponds to allowing the output of the picture corresponding to the respective second data field to be repeated one of more than once or until the output of next picture to be output from the DPYTBO.

17. The method of claim 12, wherein the received information in the video stream is received in a message in the video stream.

18. A method, comprising: receiving a video stream in a transport stream, the video stream comprising a plurality of compressed pictures; and receiving information in the video stream, wherein the information includes plural data fields, the received information comprising: a first data field corresponding to decompressed pictures yet to be output (DPYTBO) by a video decoder at a potential splice point (IPSP) when the video decoder decompresses the video stream, wherein a value of the first data field is a number corresponding to the DPYTBO by the video decoder at the IPSP; and a plurality of second data fields that provide information corresponding to the relative output times of the DPYTBO by the video decoder at the IPSP.

19. The method of claim 18, wherein the received information conveys repeating the output of at least one of the DPYTBO by the video decoder at the IPSP.

20. The method of claim 18, wherein the received information conveys a gap in output of the DPYTBO by the video decoder at the IPSP.

* * * * *